United States Patent [19]

Kishimoto et al.

[11] Patent Number: 5,687,402
[45] Date of Patent: Nov. 11, 1997

[54] AUTOMATIC FOCUSING CAMERA PROVIDED WITH AN AUXILIARY LIGHT EMITTER

[75] Inventors: Tsuyoshi Kishimoto, Kawanishi; Norihiko Akamatsu, Suita; Hiroshi Ueda, Habikino; Masataka Hamada, Osakasayama; Kazuhiko Yukawa, Sakai, all of Japan

[73] Assignee: Minolta Co., Ltd., Osaka, Japan

[21] Appl. No.: 576,166

[22] Filed: Dec. 21, 1995

Related U.S. Application Data

[63] Continuation of Ser. No. 368,901, Jan. 5, 1995, abandoned.

[30] Foreign Application Priority Data

Jan. 10, 1994 [JP] Japan .................... 6-001019

[51] Int. Cl.$^6$ .................................... G03B 13/36
[52] U.S. Cl. .................... 396/80; 396/104; 396/106
[58] Field of Search .................................. 354/403

[56] References Cited

U.S. PATENT DOCUMENTS

| | | | |
|---|---|---|---|
| 4,257,705 | 3/1981 | Hosoe et al. | 354/403 X |
| 4,367,934 | 1/1983 | Matsui | 354/403 |
| 4,518,242 | 5/1985 | Toyama | 354/403 |
| 4,592,638 | 6/1986 | Kaneda et al. | 354/403 |
| 5,144,357 | 9/1992 | Ishida et al. | |

OTHER PUBLICATIONS

Camera Annual '92, Dec. 2, 1991, p. 153.

*Primary Examiner*—W. B. Perkey
*Attorney, Agent, or Firm*—Burns, Doane, Swecker & Mathis, LLP

[57] ABSTRACT

An automatic focusing camera has a selective night view mode of photographing a scene where the brightness of a main object is lower than the brightness of a background and the brightness of the whole scene is lower than a specified value, and includes an auxiliary light emitter operable to emit an auxiliary light to the main object for focusing; a first determinator operable to determine whether an auxiliary light is necessary in the night view mode; and a controller in responsive to the first determinator to render the auxiliary light emitter emit an auxiliary light.

16 Claims, 20 Drawing Sheets

AUTOMATIC FOCUSING CAMERA PROVIDED WITH AN AUXILIARY LIGHT EMITTER

This application is a continuation, of application Ser. No. 08/368 901, filed Jan. 5, 1995, abandonded.

BACKGROUND OF THE INVENTION

This invention relates to an automatic focusing camera which calculates a control value used to automatically focus a taking lens on the basis of an unsharpness amount of an object image on a film surface and executes an automatic focusing control based on the calculation result.

An automatic focusing (AF) camera has been known which is provided with a photographing mode in which the photographing is carried out for a scene having a night view as a background based on predetermined suitable exposure control conditions (hereinafter, referred to as a night view mode).

In this camera, the AF control is carried out as follows. An unsharpness amount of an object image on a film surface is calculated, for example, using a light reflected by an object. A control value used to drive a taking lens to attain an in-focus condition (AF control values) is calculated based on the unsharpness amount. The taking lens is driven based on the calculated control values.

The above camera may be provided with an auxiliary light emitter for the AF control. For instance, when it is difficult to calculate the AF control value because of the insufficient reflected light from the object, this emitter emits an auxiliary light toward the object so that the unsharpness amount of the object image on the film surface and the AF control value can be calculated with the assist of the reflected light of the auxiliary light.

In a scene photographed in the night view mode, generally, a person (main object) is photographed with a building illuminated in the dark for a background. Thus, only the background tends to especially have a high brightness in a photographing field. If the background building is included in a metering area within the photographing field during the AF control for such a scene, the AF control value is calculated based on image data of the building having a high brightness. As a result, the taking lens is erroneously driven to be focused at the background building despite the fact that it should be focused at the person standing in front of the building.

In order to avoid such an erroneous operation, the auxiliary light may be emitted, but this can be done by a manual operation with the conventional AF camera. Therefore, unless an operator has a certain level of experience in the auxiliary light emission, it is difficult to securely emit an auxiliary light for a scene which can be suitably photographed in the night view.

SUMMARY OF THE INVENTION

It is an object of the invention to provide an automatic focusing camera which has overcome the problems residing in the prior art.

It is another object of the invention to provide an automatic focusing camera which can focus a taking lens at an object with high security and accuracy even when the object in a night view is to be photographed.

Accordingly, the invention is directed to a camera comprising: a photographing device having a taking lens and operable to photograph a scene consisting of a main object and a background, the photographing device having a selective night view mode of photographing a scene where the brightness of a main object is lower than the brightness of a background and the brightness of the whole scene is lower than a specified value; an automatic focusing device operable to place the taking lens in an in-focus condition based on light from the scene, the automatic focusing device including: an auxiliary light emitter operable to emit an auxiliary light to the main object for focusing; a determinator operable to determine whether an auxiliary light is necessary in the night view mode; and a controller in responsive to the determinator to render the auxiliary light emitter emit an auxiliary light.

It may be preferable to provide the photographing device with a manually operable setting member to set the night view mode.

It may be appreciated that the determinator determines the necessity of an auxiliary light emission when the main object is in a low contrast state.

Also, it may be appreciated that the determinator determines the necessity of an auxiliary light emission when the photographic magnification is set at a value smaller than a predetermined value.

Further, it may be appreciated that the determinator determines the necessity of an auxiliary light emission when the brightness of the main object is in a value smaller than a predetermined value.

Moreover, the present invention is directed to a camera comprising: a photographing device having a taking lens and operable to photograph a scene consisting of a main object and a background, the photographing device having a selective night view mode of photographing a scene where the brightness of a main object is lower than the brightness of a background and the brightness of the whole scene is lower than a specified value; a focus condition detector operable to detect a focus condition of the taking lens; an auxiliary light emitter operable to emit an auxiliary light for focus condition detection; a determinator operable to determine whether it is necessary to put the an auxiliary light emitter in operation in the night view mode; a first controller in responsive to the determinator to render the auxiliary light emitter emit an auxiliary light to execute a focus condition detection, and adjust the focus condition of the taking lens based on a result of the focus condition detection when the determinator determines an auxiliary light emission is necessary; and a second controller in responsive to adjust the focus condition of the taking lens based on a detection result which has been obtained without an auxiliary light emission when the determinator determines an auxiliary light emission is not necessary.

With thus constructed camera, there is provided the night view mode. When the night view mode is set, it is judged whether an auxiliary light emission for focusing is necessary. If necessary, an auxiliary light is emitted to the main object. This will eliminate the likelihood of erroneous calculation of the automatic focusing due to a background brighter than the main object. The automatic focusing is securely controlled for the main object darker than the background, thereby accurately providing the in-focus condition to the main object even when photographing a night scene.

These and other objects, features and advantages of the present invention will become more apparent upon a reading of the following detailed description and accompanying drawings.

BRIEF DESCRIPTION OF THE DRAWINGS

FIG. 10A showing the photographing field of a camera provided with an AF function of single metering system and FIG. 10B showing the photographing field of a camera provided an AF function of multiple metering system;

DETAILED DESCRIPTION OF THE PREFERRED EMBODIMENTS OF THE INVENTION

Figure 1:
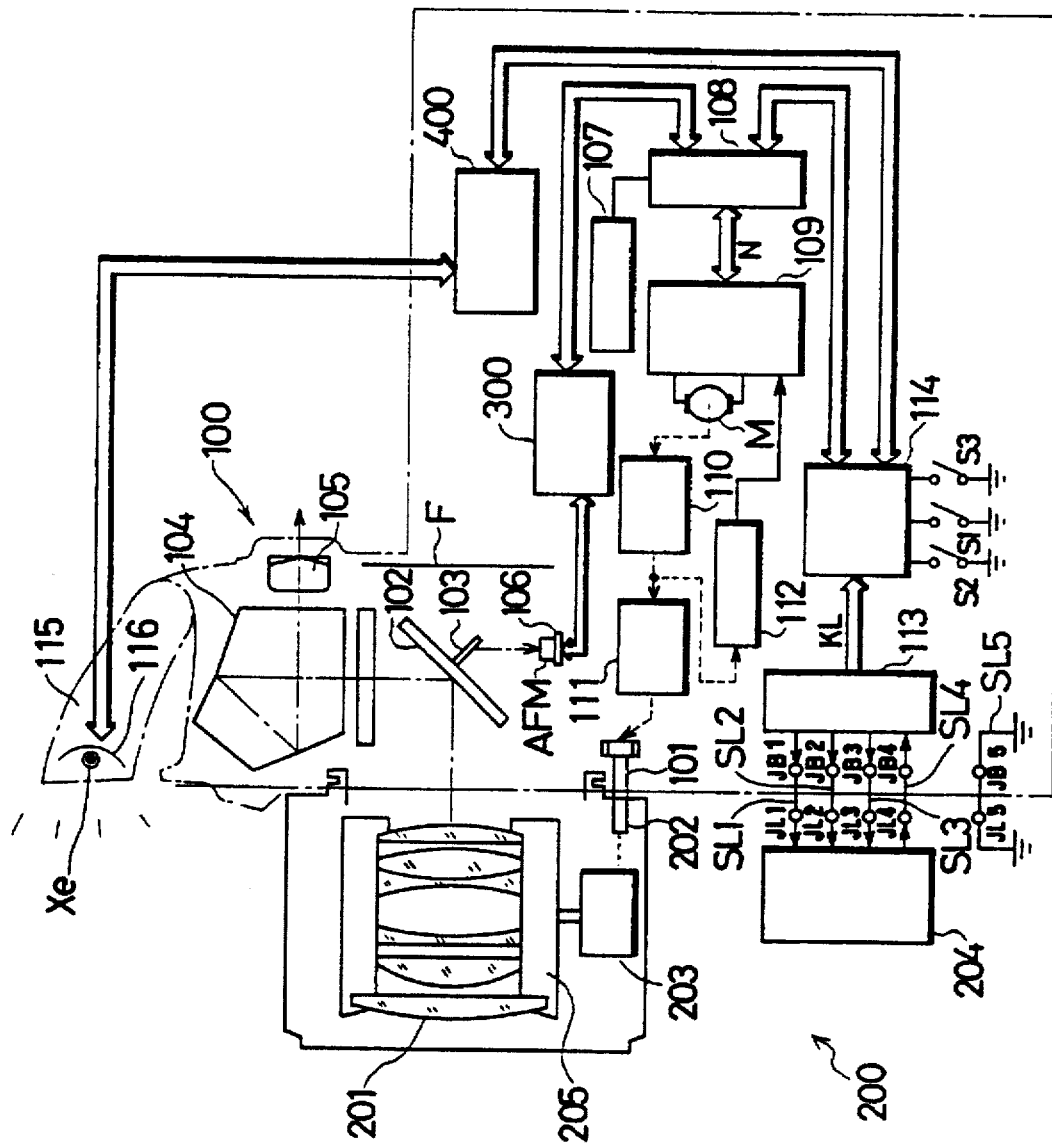
FIG. 1 is a diagram showing an overall construction of an AF camera system according to the invention.

FIG. 1 is a diagram showing an overall construction of an AF camera system according to the invention. FIG. 1 exemplifies a single-lens reflex camera system. The camera system includes a camera main body 100 and an interchangeable lens 200. The interchangeable lens 200 is provided with a taking lens 201, a clutch 202, a transmission mechanism 203 and a lens circuit 204. The taking lens 201 includes a focusing lens group and a zoom lens group. The clutch 202 is engaged to transmit a driving force of a drive motor M to the focusing lens group. The drive motor M is used for the AF control and provided in the camera main body 100. The transmission mechanism 203 transmits the driving force transmitted to the clutch 202 further to the focusing lens group. A lens data peculiar to the taking lens 201 is stored in the lens circuit 204.

The above lens data is a conversion factor KL for converting a defocus amount of an object image into a drive control value (hereinafter referred to as an AF control value) in accordance with which the focusing lens group of the taking lens 201 is driven to attain an in-focus condition. The conversion factor KL will be described in more detail later.

The taking lens 201 is movably carried in a barrel of the interchangeable lens 200 by way of a helicoid 205. The clutch 202 is provided on an attachment surface of the interchangeable lens 200 to the camera main body 100. When the interchangeable lens 200 is attached to the camera main body 100, the clutch 202 is coupled with a clutch 101 provided at a corresponding position on an attachment surface of the camera main body 100, and thereby the driving force of the drive motor M is transmitted to the transmission mechanism 203 by way of the clutches 101 and 202.

Upon receipt of the driving force transmitted by the transmission mechanism 203, the helicoid 205 is rotated, thereby moving the focusing lens group of the taking lens 201.

Connection terminals JL1 to JL5 are also provided on the attachment surface of the interchangeable lens 200. When the interchangeable lens 200 is attached to the camera main body 100, the connection terminals JL1 to JL5 are connected with connection terminals JB1 to JB5 provided at corresponding positions of the attachment surface of the camera main body 100.

The following signal lines SL1 to SL5 are made functional by connection of the terminals JL1 to JL5 with the terminals JB1 to JB5:

SL1: power supply line to the lens circuit 204
SL2: communication line for data communication clock
SL3: communication line for data reading start signal
SL4: communication line for lens data
SL5: earth line.

The lens circuit 204 is connected with a reading circuit 113 provided in the camera main body 100 by way of the signal lines SL1 to SL5.

The power to the lens circuit 204, data communication clock and data reading start signal are transmitted from the camera main body 100 to the lens circuit 204, and the lens data is transmitted from the lens circuit 204 to the camera main body 100.

The reading circuit 113 reads the lens data from the lens circuit 204 when the interchangeable lens 200 is attached to the camera main body 100. The lens data read by the reading circuit 113 is input to a camera controller 114 for centrally controlling a photographing operation of the camera.

The camera main body 100 is provided with a reflection mirror including a main mirror 102 and a sub-mirror 103 provided at suitable positions on an optical axis. A film surface F is located behind this reflection mirror.

The main mirror 102 is a semitransparent mirror and the sub-mirror 103 is an entire reflection mirror. A part of a light representing an object image transmitted through the taking lens 201 is reflected upward by the main mirror 102 and further introduced to a viewfinder optical system 105 by way of a pentaprism 104. The light representing the object image transmitted through the main mirror 102 is reflected downward by the sub-mirror 103 and introduced to an AF sensor module AFM.

In the camera main body 100, there is provided an AF control system including the AF sensor module AFM, an AF controller 108, a motor driver 109, the drive motor M, a slip mechanism 110, a driving mechanism 111 and an encoder 112.

The AF sensor module AFM includes a separator lens for separating the light image of the object introduced by the sub-mirror 103 into two light images and a solid-state image pick-up device 106 (hereinafter, referred to as an AF sensor 106) consisting essentially of a CCD (charge coupled device) for sensing the separated light images. The module AFM functions as a sensor unit of the AF control system to be described later.

Figure 3:
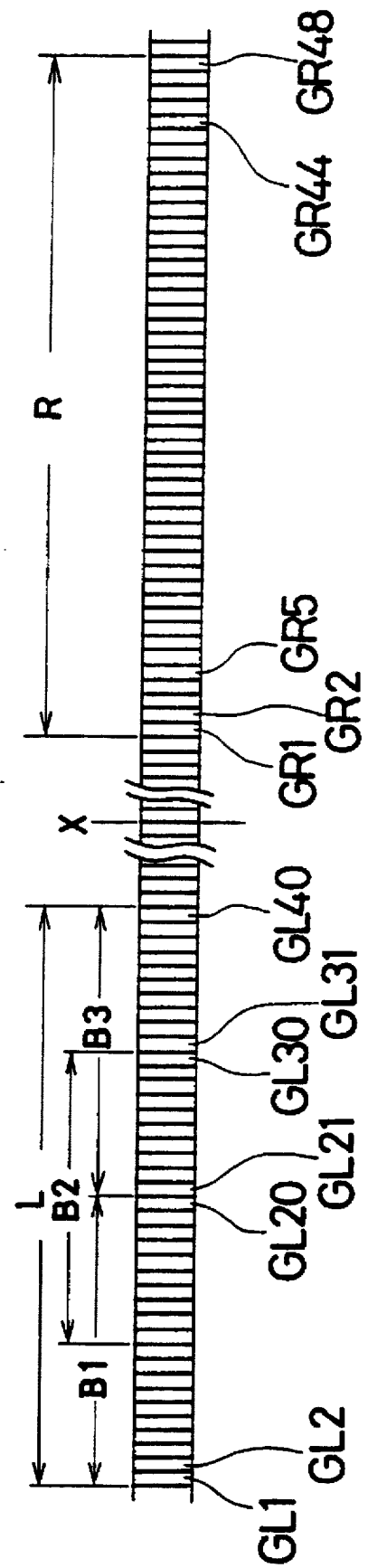
FIG. 3 is a diagram showing a construction of a sensing surface of an AF sensor used in the camera.

The AF sensor 106 includes, as shown in FIG. 3, a line sensor in which a plurality of photoelectric conversion elements (hereinafter, referred to as pixels) are arrayed in a line. At the left and right ends of the AF sensor 106, there are provided sensing areas for sensing the respective separated light images of the object. The sensing area L at the left end (hereinafter, referred to as a reference area L) and the sensing area R at the right end (hereinafter, referred to as a comparison area R) are separated by a separation area.

The comparison area R is larger than the reference area L. For example, the reference area L includes 40 pixels, namely, GL1 to GL40 and the comparison area R includes 48 pixels, namely, GR1 to GR48.

The reference area R is made larger than the comparison area L to detect a defocus direction and a defocus amount of the object image by comparing a pixel data representing the object image received by the respective pixels GL1 to GL40 of the reference area L (hereinafter referred to as a reference pixel data) with a pixel data representing the object image received by the pixels contained in a plurality of subregions of the comparison area R (hereinafter referred to as a comparison pixel data). For example, the reference pixel data is compared with the pixel data of the pixels GR1 to GR40, that of the pixels GR2 to GR41, that of the pixels GR3 to GR42, and so forth.

Three blocks B1, B2 and B3 are defined in the reference area L. The defocus direction and defocus amount are detected for each of these blocks. The block B1 includes the former half of the pixels in the reference area L, i.e., pixels GL1 to GL20. The block B3 includes the latter half of the pixels in the reference area L, i.e., pixels GL21 to GL40. The block B2 includes 20 pixels GL11 to GL30 in the middle of the reference area L. In order to execute the AF control with high security and accuracy, the reference area L is divided into subregions and an information concerning how the object image is defocused is detected for each subregion.

The AF sensor module AFM is connected with the AF controller 108 by way of the interface circuit 300 and is controllably driven by the AF controller 108. The AF controller 108 centrally controls the driving of the AF control system including the AF sensor module AFM, the drive motor M, and like driving system. The AF controller 108 is communicably connected with the camera controller 114 and carries out the AF control under the control of the camera controller 114.

The AF controller 108 is provided with a memory 107 including an EEPROM (electrically erasable and programmable ROM) in which data necessary for the AF control calculation are prestored.

The interface circuit 300 controls the driving of the AF sensor module AFM in accordance with the control of the AF controller 108, applies a specified data processing to the pixel data obtained in the AF sensor module AFM, and inputs the processed data to the AF controller 108.

Figure 2:
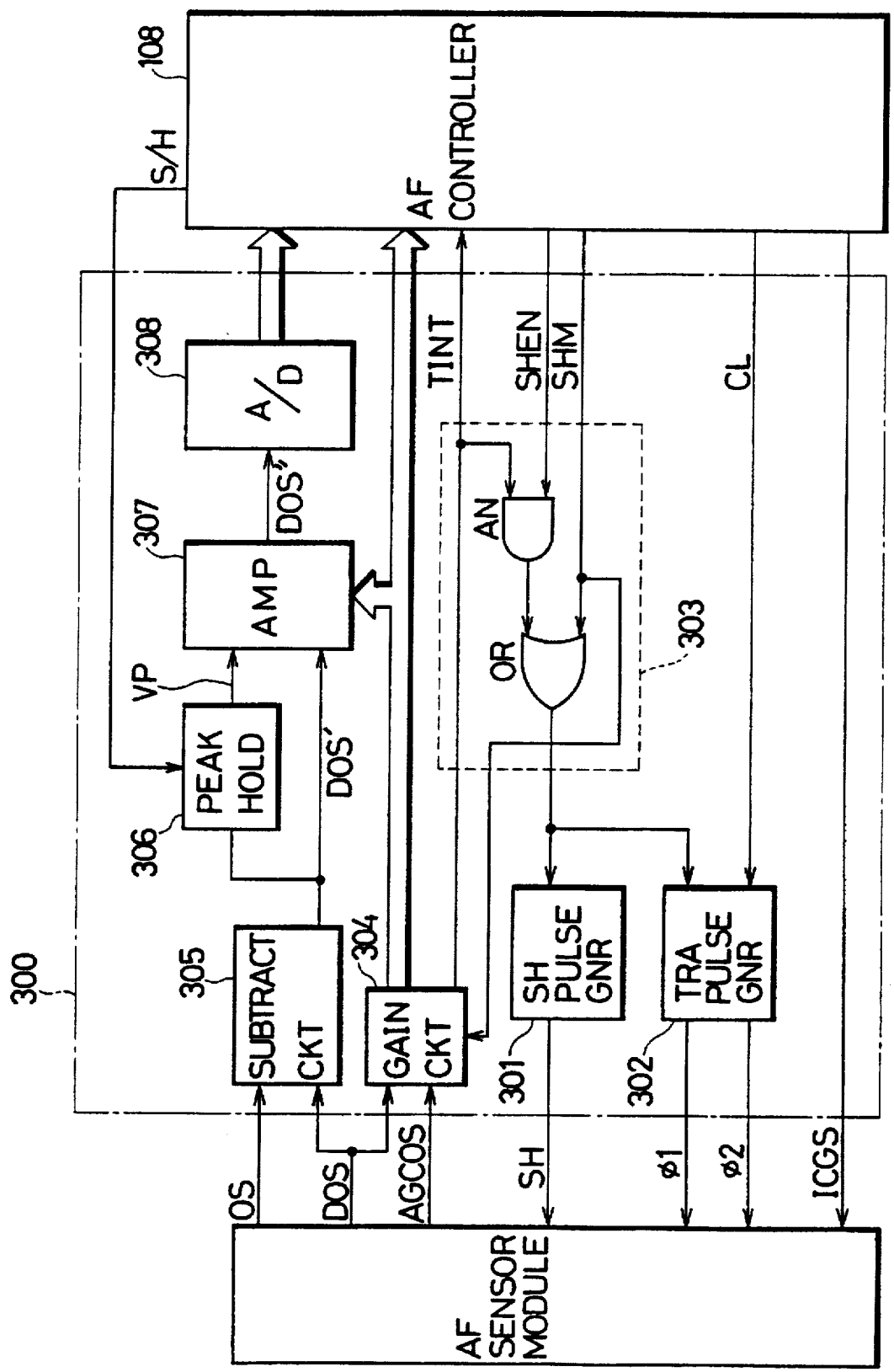
FIG. 2 is a block diagram of an interface circuit used in the camera.

FIG. 2 is a block diagram of the interface circuit 300.

A SH pulse generator 301 generates a shift pulse SH for designating the stop of integrating electric charges stored in the AF sensor 106 (integration of the AF sensor 106) in the module AFM. A transfer pulse generator 302 generates transfer pulses ø1 and ø2 to be sent to a transfer register in the module AFM to read the pixel data stored in the AF sensor 106. A timing signal generator 303 generates timing signals for designating a pulse generation timing of the SH pulse generator 301 and the transfer pulse generator 302.

A gain control circuit 304 detects a completion timing of the storing of electric charges in the AF sensor 106 and controls a gain of a variable gain amplifier 307. The gain control circuit 304 detects the above completion timing by comparing a monitor signal AGCOS output from a monitor circuit (not shown) for monitoring the brightness of the object which is built in the module AFM with a reference signal DOS output from a reference signal generator (not shown) built in the module AFM.

The monitor signal AGCOS is such that its level is reduced at a speed in proportion to the brightness of the object. The gain control circuit 304 detects as the above completion timing a timing at which the level of the monitor signal AGCOS falls below a predetermined level relative to the reference signal DOS and sends a detection signal to the timing signal generator 303. Upon receipt of the detection signal, the generator 303 generates a timing signal for designating the completion of the integration of the AF sensor 106. This timing signal is sent to the SH pulse generator 301 and transfer pulse generator 302.

The gain control circuit 304 detects a relative level of the monitor signal AGCOS to the reference signal DOS after lapse of a predetermined time (e.g., 100 ms.) following the start of the integration of the AF sensor 106 and sends the detection result as a gain control condition to the variable gain amplifier 307.

A subtracting circuit 305 converts the signal level of the pixel data read from the AF sensor module AFM into the signal level in proportion to the intensity of the incident light. In other words, the pixel data read from the module AFM has a voltage level in inverse proportion to the intensity of the incident light. The subtracting circuit 305 subtracts a voltage level OS of each pixel data from a specified reference signal level DOS and sends the subtraction result DOS' (=DOS−OS) as a pixel data to the AF controller 108.

A peak hold circuit 306 holds a dark output level of the AF sensor 106. The AF sensor 106 has an area used not as a sensing area at the left side of the reference area L shown in FIG. 3. The seventh to tenth pixels in this area are masked so as to detect the dark output level of the AF sensor 106. The peak hold circuit 306 holds as a dark output level data the respective pixel data DOS' corresponding to the masked pixels in accordance with a sample hold signal from the AF controller 108.

The variable gain amplifier 307 has a variable gain and amplifies the pixel data DOS' output from the subtracting circuit 305 with a specified gain. The gain of the amplifier 307 is set at a specified value in accordance with the gain control condition input from the gain control circuit 304. The amplifier 307 corrects the signal level by subtracting the dark output level data from each pixel data DOS', and then amplifies the pixel data DOS' with the set gain.

An analog-to-digital (A/D) converter 308 A/D converts the pixel data DOS' output from the amplifier 307 and sends the resulting data to the AF controller 108.

In the above construction, when the camera controller 114 instructs the AF control, the AF controller 108 drives the AF sensor module AFM to read the pixel data composing the object image and calculates the defocus direction and defocus amount of the object image based on the pixel data.

In reading the pixel data, the AF controller 108 sends a clear signal ICGS to the module AFM. Upon receipt of the clear signal ICGS, the respective pixels of the AF sensor 106 in the module AFM are reset to their initial states and then the AF sensor 106 starts picking up the object image (integrating the stored electric charges).

Further, the monitor signal AGCOS of the monitor circuit in the module AFM is set to a specified level (e.g., supply voltage level). The monitor circuit outputs the monitor signal AGCOS whose level is reduced at the speed corresponding to the brightness of the object according to the amount of the light received by the AF sensor 106.

In synchronism with the sending of the clear signal ICGS, the AF controller 108 sends a shift pulse generation enabling signal SHEN of high level to an AND circuit AN in the timing signal generator 303.

Upon start of the integration of the AF sensor 106, the module AFM sends the reference signal DOS to the gain control circuit 304 and subtracting circuit 305. The gain control circuit 304 compares the monitor signal AGCOS with the reference signal DOS to detect the gain control condition and sends the detection result to the variable gain amplifier 307.

Upon detecting that the level of the monitor signal ACGOS falls below the predetermined level relative to that of the reference signal DOS within the predetermined time after the start of the integration of the AF sensor 106, the gain control circuit 304 sends a detection signal TINT of high level to the AF controller 108 and timing signal generator 303.

When the timing signal generator 303 receives the detection signal TINT, an output signal of high level is fed from the AND circuit AN to an OR circuit OR. Upon receipt of the output signal of high level, the OR circuit OR feeds an output signal of high level to the SH pulse generator 301 and transfer pulse generator 302.

Upon receipt of this output signal, the SH pulse generator 301 generates the shift pulse SH, which is then input to the module AFM, with the result that the integration of the AF sensor 106 is stopped. On the other hand, upon receipt of this output signal, the transfer pulse generator 302 generates the transfer pulses ø1 and ø2 in accordance with clock pulses CL input from the AF controller 108. The generated transfer pulses ø1 and ø2 are input to the module AFM, with the result that the electric charges stored in each pixel of the AF sensor 106 are read.

The phases of the transfer pulses ø1 and ø2 are different from each other by 180°. The pixel data OS stored in the respective pixels of the AF sensor 106 are sequentially read in synchronism with the rise of the transfer pulse ø1. The read pixel data are input to the AF controller 108 after being subjected to the specified data processings in the subtracting circuit 305, peak hold circuit 306, variable gain amplifier 307 and A/D converter 308.

When no detection signal TINT is output from the timing signal generator 303 during the predetermined time after the start of the integration in the AF sensor 106, the AF controller 108 outputs a shift pulse generation command signal SHM of high level to the OR circuit OR in the timing signal generator 303.

Thereby, the timing signal generator 303 feeds a high level output signal to the SH pulse generator 301 and transfer pulse generator 302. As a result, the integration of the AF sensor 106 is forcibly stopped in the same manner as described above, and the pixel data stored in the respective pixels of the AF sensor 106 are read.

The AF controller 108 stores the read pixel data in its internal memory and calculates the defocus direction and defocus amount using these pixel data. Based on the defocus amount, the AF controller 108 further calculates a control value used to drive the focusing lens group of the taking lens 201 (hereinafter, referred to as AF control values). The AF control value is fed to the motor driver 109 as an AF control information together with a driving direction corresponding to the defocus direction.

Referring back to FIG. 1, the motor driver 109 controls the driving of the drive motor M in accordance with the AF control information input from the AF controller 108. The drive motor M includes, for example, a stepping motor and acts as a driving source (drive means) for the focusing lens group of the taking lens 201.

The slip mechanism 110 includes a torque limiter which rotates idly when a load torque becomes greater than a specified value to prevent the excessive load torque from being exerted on the drive motor M. The driving mechanism 111 is adapted to adjust the driving force of the drive motor M to have a predetermined rotating speed and to transmit the adjusted driving force to the clutch 101.

The encoder 112 detects the number of rotation made by a rotatable shaft of the drive motor M. When the rotatable shaft of the drive motor M makes a turn, the encoder 112 generates a pulse train having a specified number of pulses, which is fed back to the motor driver 109.

Here, the AF control value is described.

Let it be assumed that: NM (rpm) denotes the number of rotation of the drive motor M, NE the number of pulses detected by the encoder 112, ρ detection accuracy of the encoder 112 or the number of encode marks per circumference, μP a reduction gear ratio of the number of rotation between the rotatable shaft of the drive motor M and a mount shaft of the encoder 112, μB a reduction gear ratio of the number of rotation between the rotatable shaft of the drive motor M and a rotatable shaft of the clutch 101, μL a reduction gear ratio of the number of rotation between a rotatable shaft of the clutch 202 and the helicoid 205. LH (mm/rotation) a moving amount of the helicoid 205 per rotation, and Δd (mm) a moving amount of the focusing lens group (hereinafter referred to as a lens moving amount). The detected pulse number NE and the lens moving amount Δd are expressed in the following equation (1).

$$NE = \rho \times \mu P \times NM \qquad \text{[Equation 1]}$$

$$\Delta d = NM \times \mu B \times \mu L \times LH$$

By eliminating the number of rotation NM from the equation (1), the lens moving amount Δd is expressed in the following equation (2).

$$\Delta d = NE \times \mu B \times \mu L \times LH / (\rho \times \mu P) \qquad \text{[Equation 2]}$$

Let it further be assumed that ΔL (mm) a moving amount of a focusing position of the light image of the object when the focusing lens group is moved by the moving amount Δd and Kop (=Δd/ΔL) a ratio of the lens moving amount to the moving amount of the light image. Then, the pulse number N detected by the encoder 112 is expressed as in the following equation (3) from the equation (1).

$$N = Kop \times \Delta L \times \rho \times \mu P / (\mu B \times \mu L \times LH) \qquad \text{[Equation 3]}$$

If KL=Kop/(μL×LH) and KB=ρ×μP/μB, the detected pulse number NE is expressed as in the following equation (4), thereby establishing a relationship between the detected pulse number NE and the moving amount ΔL of the light image.

$$NE = K \times \Delta L \qquad \text{[Equation 4]}$$

where

K=KB×KL

Since the detected pulse number NE corresponds to an actual driving amount of the drive motor M, the moving amount ΔL of the light image can be controlled by controlling this driving amount. Conversely, if the distance between the film surface F and the focusing surface where the object image is focused, i.e., the defocus amount Df (mm), is known, the focusing surface of the object image can be caused to coincide with the film surface F by driving the drive motor M in the specified direction in accordance with the pulse number obtained by substituting the defocus amount Df for ΔL in the equation (4).

The AF control values include the defocus amount calculated from the pixel data composing the object image which are obtained in the AF sensor module AFM and the control pulse number N (=K×Df) used to drive the drive motor M which is calculated from the conversion factor K (=KB×KL) using the equation (4).

The factor KB is a value peculiar to the camera main body 100 which pertains to the reduction gear ratios μB and μP in the driving mechanism and the detection accuracy ρ of the encoder 112 in the camera main body 100. Thus, the factor KB is set to a predetermined value in advance and is stored in the internal memory of the camera controller 114 as a conversion factor for converting the defocus amount Df into the AF control value.

The factor KL corresponds to the lens data and is a value peculiar to the lens which pertains to the moving amount ratio Kop, reduction gear ratio μL and the moving amount LH of the helicoid 205 in the interchangeable lens 200. Thus, the factor KL is set to a predetermined value for each interchangeable lens and is stored in the lens circuit 204 as a conversion factor for converting the defocus amount Df into the AF control value.

When the interchangeable lens 200 is attached to the camera main body 100, the camera controller 114 reads the conversion factor KL peculiar to the lens from the lens circuit 204 by way of the reading circuit 113, calculates the conversion factor K based on the conversion factor KL and the conversion factor KB peculiar to the camera main body 100, and sends the calculation result to the AF controller 108.

The AF controller 108 calculates the AF control value (control pulse number N used to drive the drive motor M) based on the defocus amount Df and the conversion factor K, and sends the calculation result and the information concerning the driving direction to the motor driver 109, thereby controlling the driving of the taking lens 201. The motor driver 109 causes the drive motor M to rotate in the specified direction in accordance with the input AF control information.

The rotational force of the drive motor M is transmitted to the focusing lens group of the taking lens 201 by way of the slip mechanism 110, driving mechanism 111, clutches 101 and 202, transmission mechanism 203 and helicoid 205, with the result that the focusing lens group is moved in the specified direction. In synchronism with the rotation of the drive motor M, the rotating amount (pulse number NE) is detected by the encoder 112 and the detection result is sent to the motor driver 109. The motor driver 109 causes the drive motor M to stop rotating when the input pulse number NE reaches the AF control value N. In this way, the focusing lens group is moved to attain an in-focus condition.

The motor driver 109 also functions as stop detecting means for detecting the stop of movement of the focusing lens group of the taking lens 201 while the drive motor M is controllably driven. More specifically, the slip mechanism 110 rotates idly due to an excessive load when the focusing lens group stops moving and no more detection pulse is input from the encoder 112 to the motor driver 109. The motor driver 109 detects the stop of movement of the focusing lens group based on that no detection pulse is input, and sends the detection result to the AF controller 108.

Upon receipt of the detection signal representing the stop of movement of the taking lens 201, the AF controller 108 carries out a specified limit check processing. The limit check processing will be described in detail later.

The camera main body 100 is provided internally with a flash device 115 and a flash control circuit 400 for controlling the driving of the flash device 115. The flash device 115 includes a xenon tube Xe as a light source and a reflector 116 for reflecting flash of light emitted from the xenon tube Xe forward. The flash device 115 can be popped up to a position above the pentaprism 104 of the camera main body 100. When popped up, the flash device 115 is activated and automatically brought into an emission enabled state. When retracted inside the camera main body 100, the flash device 115 stops its operation.

Further, an external flash device (not shown) is attachable to the camera main body 100. When the external flash device is attached, an operator is allowed to selectively use either the built-in flash device 115 or the external flash device.

The built-in flash device 115 and the external flash device are not only used as a light source of an auxiliary light for illuminating the object, but also used as a light source of an auxiliary light which is emitted for the metering during the AF control when it is difficult to attain a focusing condition due to low brightness or low contrast of the object.

When the flash device is fired to emit the auxiliary light for the metering, it intermittently emits light with a specified frequency so as not to be dazzling to the eyes of the object person. It is described later how the built-in flash device 115 and the external flash device emit the auxiliary light for the metering.

The flash control circuit 400 is communicably connected with the camera controller 114 and controls the firing of the built-in flash device 115 under the control of the camera controller 114. By means of the flash control circuit 400, the camera controller 114 controls the built-in flash device 115 and the external flash device to emit normal flash of light as well as the auxiliary light during the AF control.

Figure 4:
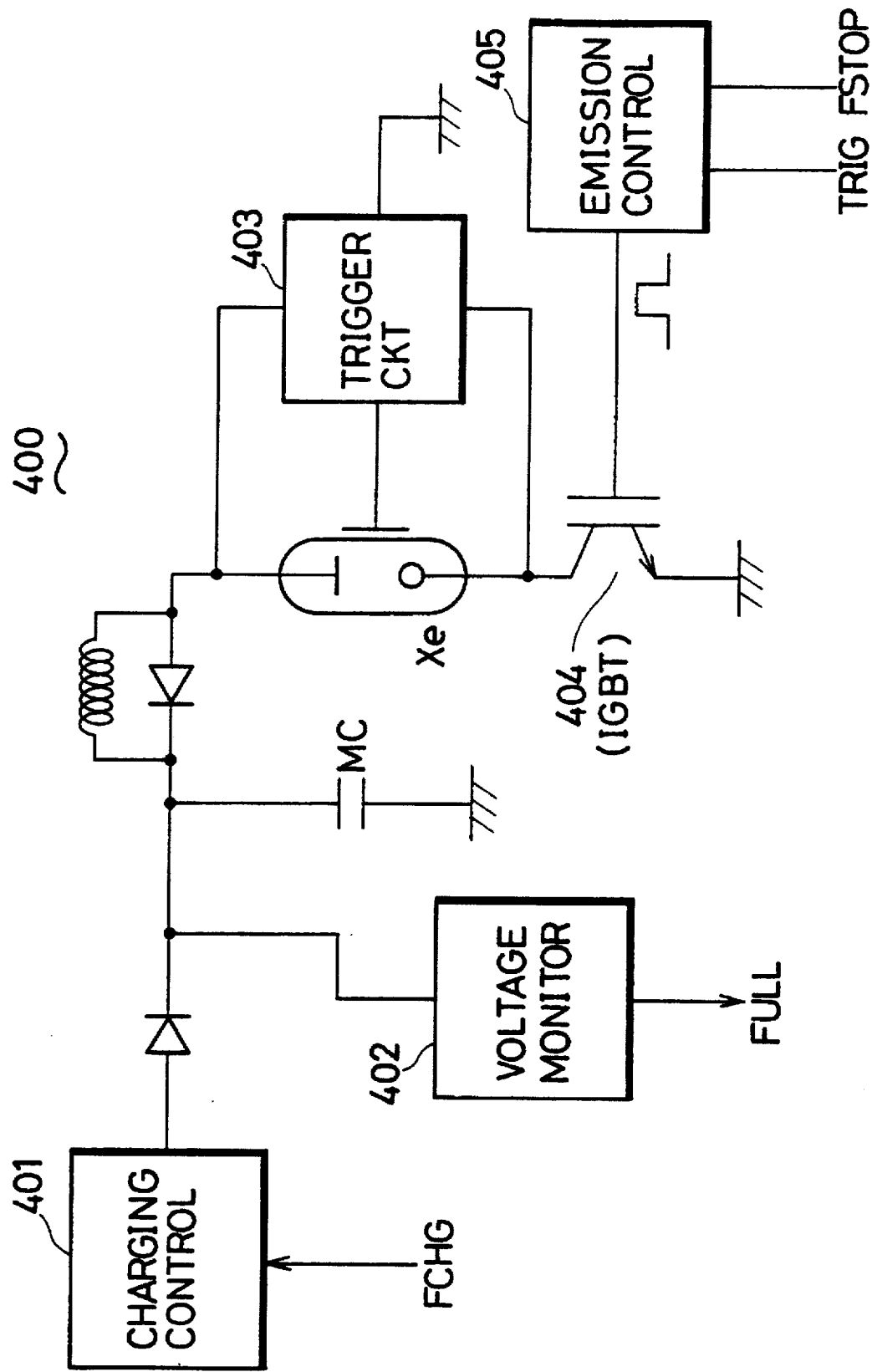
FIG. 4 is a block diagram of a flash control circuit.

FIG. 4 is a block diagram of the flash control circuit 400.

The flash control circuit 400 includes a main capacitor MC, a charging control unit 401, a voltage monitoring unit 402, a trigger circuit 403, a switching device 404 and an emission control unit 405. The main capacitor MC mainly stores electric charges to be supplied to the xenon tube Xe. The charging control unit 401 controls the charging of the main capacitor MC. The voltage monitoring unit 402 monitors a voltage of the electric charges stored in the main capacitor MC. The trigger circuit 403 generates a trigger signal for designating the discharge of the xenon tube Xe. The switching device 404 (hereinafter, referred to as an IGBT 404) includes an IGBT (insulated gate bipolar transistor) for controlling the continuous discharge of the xenon tube Xe. The emission control unit 405 controls the discharge of the xenon tube Xe.

The camera controller 114 sends a charging control signal FCHG to the charging control unit 401, which in turn controls the start and stop of the charging in the main capacitor MC in accordance with the received signal FCHG.

The signal FCHG is a state designating signal whose low level and high level are, for example, allotted to a stop state and a drive state, respectively. The charging control unit 401 starts the charging upon rise of the signal FCHG, and causes the main capacitor MC to store electric charges under specified charging conditions while the signal FCHG is at high level. The unit 401 stops the charging upon fall of the signal FCHG.

It should be appreciated that the allotment of the stop state and drive state to the low level and high level of the signal FCHG may be reversed.

The voltage monitoring unit 402 detects the voltage of the electric charges stored in the main capacitor MC and judges based on the detection result whether or not the charging of the main capacitor MC has been completed. Upon judgment that the charging of the main capacitor MC has been completed, the unit 402 sends a charging completion signal FULL to the camera controller 114. Upon receipt of the signal FULL, the camera controller 114 inverts the state of the signal FCHG, thereby instructing the stop of the charging to the charging control unit 401.

The trigger circuit 403 applies a trigger voltage to the xenon tube Xe in synchronism with turn-on of the IGBT 404, thereby exciting the xenon tube Xe to discharge. More specifically, when the IGBT 404 provided between one electrode of the xenon tube Xe and a ground is turned on, a terminal voltage (high voltage) of the main capacitor MC is applied between the electrodes of the xenon tube Xe to excite the xenon tube Xe and a trigger voltage is applied to a trigger electrode to cause the xenon tube Xe to discharge.

The IGBT 404 causes the xenon tube Xe to continuously discharge at a high speed by on-off controlling supply of electric charges stored in the main capacitor MC to the xenon tube Xe. The emission control unit 405 controls the discharge of the xenon tube Xe by on-off controlling the IGBT 404.

The camera controller 114 sends to the emission control unit 405 an emission control signal TRIG for designating an emission timing and an emission stop control signal FSTOP for designating a stop timing of the light emission. The emission control unit 405 on-off controls the IGBT 404 by controlling a gate voltage of the IGBT 404 in accordance with the signals TRIG and FSTOP.

Upon receipt of the signal TRIG, the emission control unit 405 sets the gate voltage at high level, thereby turning on the IGBT 404. On the other hand, upon receipt of the signal FSTOP, the unit 405 inverts the gate voltage to low level, thereby turning off the IGBT 404.

When the built-in flash device 115 is used to emit the auxiliary light for the AF control, the emission control unit 405, upon receipt of the signal TRIG, sends a pulse train of predetermined frequency to the gate of the IGBT 404, thereby turning on and off the IGBT 404 by inverting the gate voltage to on-voltage in a specified cycle. Thus, the xenon tube Xe is caused to continuously discharge in a specified cycle (e.g., 10 Hz to several 10 Hz).

Upon receipt of the signal FSTOP, the emission control unit 405 stops the sending of the pulse train, thereby turning off the IGBT 404 to stop the continuous discharge of the xenon tube Xe.

Referring back to FIG. 1, a switch S1 is a switch for designating the photographing preparation such as AF and AE (automatic exposure) and a switch S2 is a switch for designating an exposure control. The switch S1 is turned on when a shutter release button is pressed halfway and the switch S2 is turned on when the shutter release button is pressed all the way.

A switch S3 is operated to set a night view mode as a photographing mode. In the night view mode, the photographing is carried out under the suitable exposure control conditions preset for a scene which looks dark in the entire field and in which the object is darker than the background such as when the object (person, etc.) standing at night in front of the bright background (e.g., building adorned with electric lights).

The AF control of the AF camera is described next with reference to flow charts shown in FIGS. 5 to 7, FIG. 9, FIGS. 10A to 14, FIG. 16 and FIG. 17.

Figure 5:
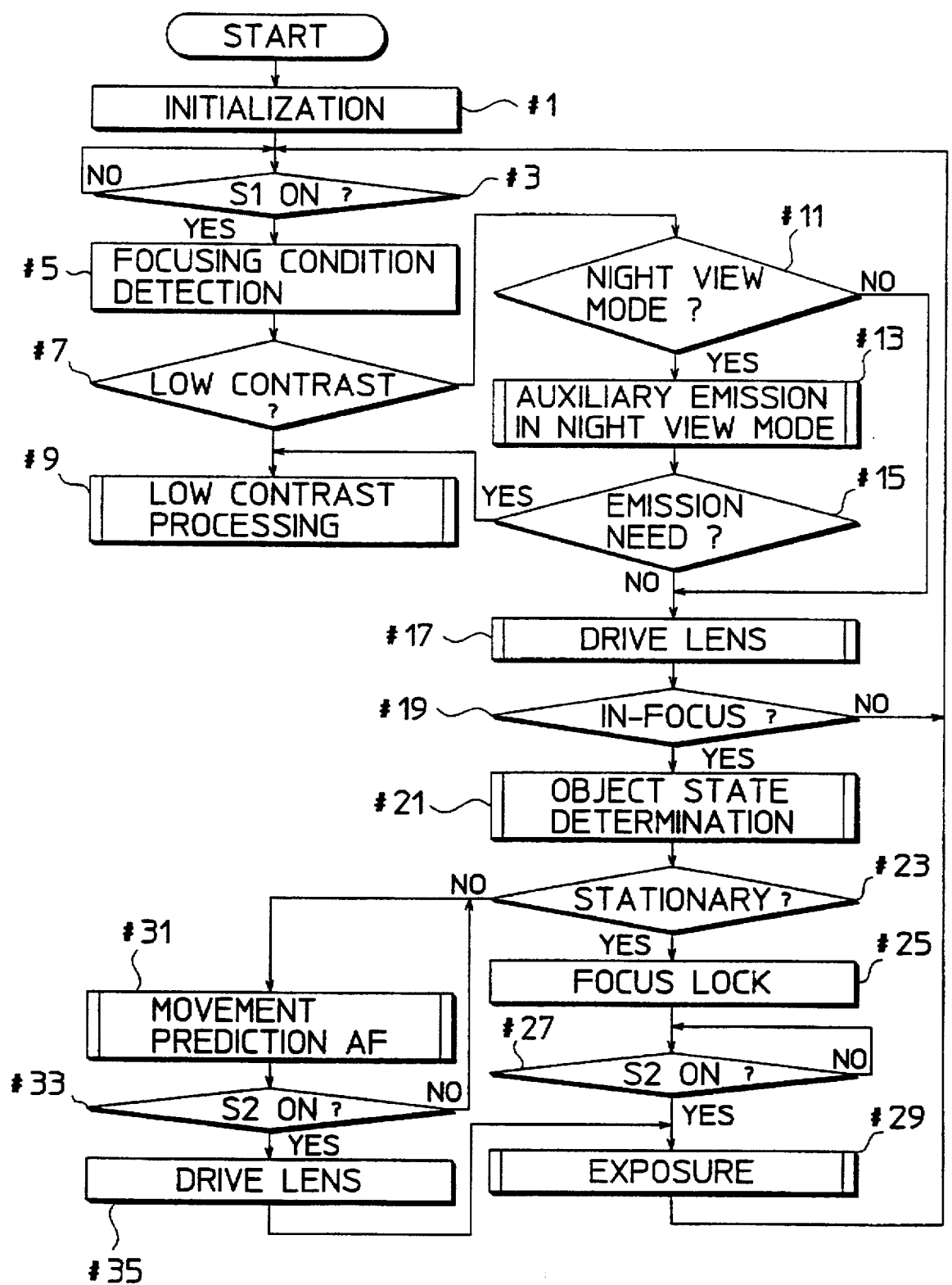
FIG. 5 is a flow chart summarily showing a main routine of an AF control of the camera.

FIG. 5 is a flow chart summarily showing a main routine of an AF control.

When a main power switch is turned on, the camera is activated. After the predetermined initialization is carried out (Step #1), this routine waits until the switch S1 is turned on (Step #3).

When the switch S1 is turned on (YES in Step #3), a subroutine "Focusing Condition Detection" is carried out to detect the defocus amount (Step #5). It is judged based on this detection result whether a scene to be photographed is in a low contrast state (Step #7). The low contrast state is a state where the brightness of the object image within a metering area is dark or the detected defocus amount may be unreliable because of insufficient contrast. If the scene to be photographed is in the low contrast state (YES in Step #7), a low contrast processing to be described later is carried out (Step #9).

If the scene to be photographed is not in the low contrast state (NO in Step #7), it is discriminated whether the night view mode has been set by operating the switch S3 (Step #11). If the night view mode is set (YES in Step #11), a subroutine "Auxiliary Light Emission Determination in Night View Mode" to be described later is carried out (Step #13). Thereafter, it is discriminated whether the auxiliary light needs to be emitted (Step #15). If the discrimination result is in the affirmative, this routine returns to Step #9 to carry out the low contrast processing.

If the night view mode is not set (NO in Step #11) or if the auxiliary light needs not be emitted although the night view mode is set (NO in Step #15), the focusing lens group of the taking lens 201 is controllably driven to adjust the in-focus condition (Step #17). This routine returns to Step #3 to carry out the above operations if the taking lens 201 is discriminated to be out of focus (NO in Step #19).

If the taking lens 201 is discriminated to be in focus (YES in Step #19), a subroutine "0.3 Seconds Object State Determination Processing" is carried out (Step #21). This determination is carried out to calculate a discrimination data for discriminating whether the object is stationary or moving. If the discrimination data indicates that the object is stationary (YES in Step #23), this routine waits until the switch S2 is turned on (Step #27) after the focusing lens group of the taking lens 201 is locked to maintain the current focus (focus lock) in Step #25. When the switch S2 is turned on, the exposure is carried out in accordance with the calculated exposure control values (Step #29).

If the object is not stationary (NO in Step #23), a subroutine "Movement Prediction AF Processing" is carried out (Step #31). This processing is carried out to predict a focusing condition for the object when the exposure is actually performed and to calculate the AF control value for this focusing condition. This processing is carried out repeatedly until the switch S2 is turned on (a loop of Steps #31 and #33). When the switch S2 is turned on (YES in Step #33), the focusing lens group of the taking lens 201 is driven in accordance with the calculated AF control values to attain an in-focus condition (Step #35). Thereafter, the exposure is performed (Step #29).

The low contrast processing is described next.

FIGS. 6A to 6D are flow charts showing the subroutine "Low Contrast Processing."

The low contrast processing is an AF control processing when the reliability of the defocus amount obtained by means of the focusing condition detection is low. As described above, when the reflected light from the object is insufficient or when the contrast of the object image is low, the reliability of the calculated defocus amount is low and it is thus difficult to obtain a sufficient focusing accuracy. In the low contrast processing, the metering mode is classified into an external flash firing mode, a built-in flash firing mode and an auxiliary light emission prohibition mode based on whether or not the external flash device is mounted, object conditions and set photographing conditions, and the AF control and exposure control suitable for the set metering mode are carried out. In the external flash firing mode, the AF control is carried out while firing the external flash device connected externally with the camera main body 100 to emit the auxiliary light for the AF control. In the built-in flash firing mode, the AF control is carried out while firing the built-in flash device of the camera main body 100 to emit the auxiliary light for the AF control. In the auxiliary light emission prohibition mode, the auxiliary light emission for the AF control by the flash device is prohibited.

When the subroutine "Low Contrast Processing" is called, the metering mode is set to one of the above three modes based on the focal length f, macrophotography magnification, object brightness BV, whether or not the built-in flash firing mode is set, whether or not the external flash device is attached, whether or not the auxiliary light emission is prohibited, and other conditions (Steps #41 to #59).

More specifically, the following discriminations are sequentially made: whether the auxiliary light emission prohibition mode is set (Step #41); whether the current focal length f is not longer than a predetermined reference value fr (a focal length corresponding to the flash light coverage, e.g., 300 mm) (Step #43); whether the macrophotography magnification of 1 or greater is set (Step #45); whether the object brightness BV is smaller than a predetermined value BVr1 (a threshold value for distinguishing the flash light from the natural light, e.g., −1(EV)) (Step #47); whether the external flash is attached (Step #49); whether the object brightness BV is smaller than a predetermined value BVr2 (e.g., −3(EV))(Step #51); and whether the built-in flash device is popped up (Step #53).

The auxiliary light emission prohibition mode is set (Step #59) when it is prohibited to fire the flash device to emit the auxiliary light by, for example, setting restriction on the number of flash firing (YES in Step #41), when f>fr (NO in Step #43), when the macrophotography magnification of 1 or greater is set (YES in Step #45), or when the object brightness BV is not smaller than the predetermined value BVr1 (NO in Step #47).

When the focal length f is greater than the reference value fr, the flash light may be unreachable to the object. Conversely, when the macrophotography magnification of 1 or greater is set, the object may be too close that the flash light cannot be projected onto the main object. In these cases, since the auxiliary light emission by the flash device does not have much effect, the auxiliary light emission is prohibited.

If the auxiliary light emission prohibition mode is not set (NO in Step #41), the focal length f is not longer than the reference value fr (YES in Step #43), the macrophotography magnification of 1 or greater is not set (NO in Step #45), and the object brightness BV is not larger than the predetermined value BVr1 (YES in Step #47), the external flash auxiliary firing mode is set when the external flash device is attached (YES in Step #49).

The built-in flash firing mode is set (Step #57) if the external flash device is not attached (NO in Step #49), the object brightness BV is smaller than the predetermined value BVr2 (YES in Step #51), and the external flash device is popped up (YES in Step #53). The auxiliary light emission prohibition mode is set (Step #59) if the object brightness BV is not smaller than the predetermined value BVr2 (NO in Step #51) or the built-in flash device is not popped up (NO in Step #53).

The low contrast processing is carried out to cause the external flash device to emit the auxiliary light if it is attached when the auxiliary light needs to be emitted. If the external flash device is not attached, the built-in flash device 115 of the camera main body 100 is caused to emit the auxiliary light. However, if −3(EV)<the object brightness BV<−1(EV), the defocus amount obtained by the focusing condition detection has relatively high reliability. Accordingly, the auxiliary light emission is prohibited, assuming that the built-in flash device 115 needs not emit the auxiliary light. If BV≦−3(EV), the built-in flash device 115 is fired. If the built-in flash device 115 is not popped up, the auxiliary light emission is prohibited because it is inoperative.

When the metering mode is set, it is followed by Step #61 (see FIG. 6B) in which the AF control is carried out in accordance with the set metering mode.

Figure 7:
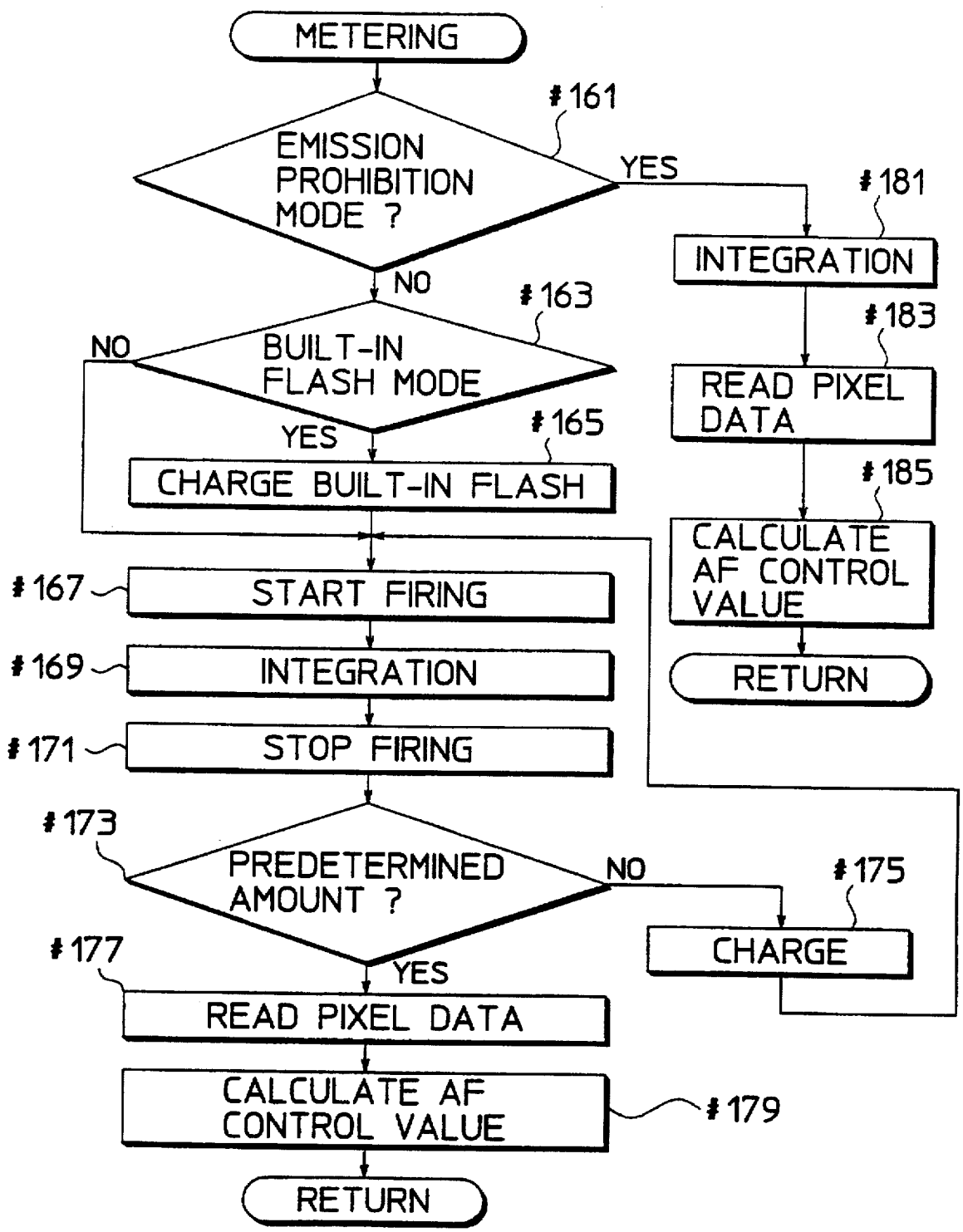
FIG. 7 is a flow chart showing a subroutine "Metering"

Specifically, the AF control values are calculated by executing a subroutine "Metering" shown in FIG. 7 (Step #61). When the subroutine "Metering" is called, it is discriminated whether the auxiliary light emission prohibition mode is set (Step #161). If this mode is set (YES in Step #161), the defocus amount and the drive control value (AF control value) used to drive the focusing lens group of the taking lens 201 to attain an in-focus condition are calculated based on the pixel data representing the natural light reflected by the object and sensed by the AF sensor 106 in Steps #181 to #185.

In Step #181, the AF sensor 106 receives a specified amount of light reflected by the object and integrates electric charges obtained by photoelectrically converting the reflected light. The AF controller 108 reads the stored electric charges (pixel data) (Step #183) and calculates the defocus amount based on the pixel data and the AF control values based on the calculated defocus amount (Step #185).

If the auxiliary light emission prohibition mode is not set (NO in Step #161), the auxiliary light is emitted by means of the built-in flash device 115 or external flash device and the defocus amount and the AF control value are calculated based on the pixel data obtained by receiving the auxiliary light reflected by the object in Steps #163 to #179.

In Step #163, it is discriminated whether the built-in flash firing more is set. If this mode is set (YES in Step #163), the built-in flash device 115 is charged (Step #165) to emit the auxiliary light.

The firing of the built-in flash device 115 is started (Step #167) and the AF sensor 106 starts storing electric charges (integration) (Step #169). The flash device 115 intermittently emits light while an amount of electric charges stored in the AF sensor 106 is detected (a loop of Steps #167 to #173). The integration of the AF sensor 106 is stopped when the amount of stored electric charges reached a predetermined amount (YES in Step #173).

At this stage, the AF controller 108 reads the obtained pixel data (Step #177) and calculates AF control value based on the pixel data (Step #179). During the intermittent light emission, the built-in flash device 115 is charged after each light emission so that a constant amount of light can be emitted each time.

Figure 8:
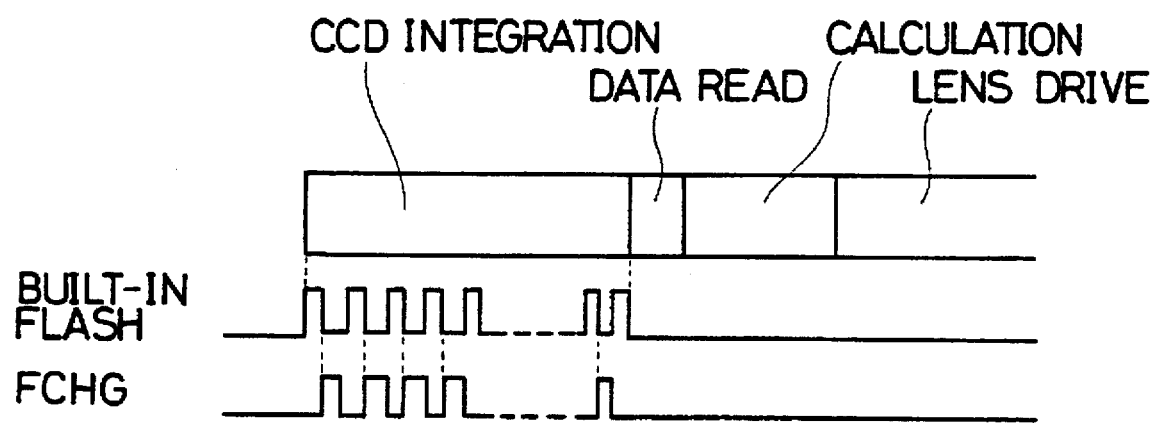
FIG. 8 is a timing chart showing a metering processing in a built-in flash firing mode.

FIG. 8 is a timing chart showing the metering processing in the built-in flash firing mode.

As seen from FIG. 8, upon start of the integration of the AF sensor 106, the built-in flash device 115 is caused to emit auxiliary light a plurality of times, each time lasting for a specified very short period, during the integration. The level of charging control signal FCHG input from the camera controller 114 to the charging control unit in the flash control circuit 400 is inverted to high level at a stop timing of each light emission from the built-in flash device 115, while being inverted to low level at a start timing thereof. The main capacitor MC is charged for each light emission.

Referring back to FIG. 7, if the built-in flash firing mode is not set (NO in Step #163), the external flash device is caused to emit the auxiliary light. Accordingly, this routine skips Step #165 and the AF control value is calculated by carrying out the light emission control similar to the one by the built-in flash device 115.

Referring back to FIG. 6B, it is discriminated based on the calculated AF control value whether the object image is in low contrast state (Step #63). If the object image is not in low contrast state (NO in Step #63), the focusing lens group of the taking lens 201 is driven to attain an in-focus condition in accordance with the AF control value (Step #65). After this drive control, it is discriminated whether a driving amount of the focusing lens to attain an in-focus condition (hereinafter, referred to as a remaining driving amount) is smaller than a predetermined driving amount Lr1 (e.g., 100 μm) (Step #67). If the remaining driving amount is smaller than Lr1 (YES in Step #67), the focusing lens group is driven the remaining driving amount upon judgment that the focusing lens group has almost been moved in the vicinity of realizing the in-focus condition (Step #69). Then, a display representing that the in-focus condition has been attained (e.g., by turning on a focus mark) is made in a display device provided in a viewfinder or camera main body 100 (Step #71).

This routine then waits until the switch S2 is turned on (until the release button is pressed all the way) (a loop of Steps #73, #77 and #71). When the switch S2 is turned on (YES In Step #73), a specified exposure processing is carried out (Step #75). This processing is carried out to drive a diaphragm to attain a specified aperture value and to drive the shutter at a specified shutter speed based on the exposure control value calculated before start of the photographing, so as to introduce a specified amount of light representing the object image onto the film surface F.

If the switch S1 is turned off before the switch S2 is turned on (the release button returns to its initial state) (YES in Step #77), this routine returns to Step #3 to carry out the AF control again.

If the remain driving amount is not smaller than Lr1 after the driving of the focusing lens group of the taking lens 201 (NO in Step #67), the AF control values are calculated after causing the external flash device or built-in flash device 115 to emit the auxiliary light (Steps #79 to #83) upon judgment that the AF control value calculated in Step #61 is not reliable.

It is then discriminated based on the newly calculated AF control values whether the object image is in low contrast state (Step #85). If the object image is not in low contrast state (NO in Step #85), the focusing lens group of the taking lens 201 is driven to attain an in-focus condition in accordance with the AF control value (Step #87). After this drive control, it is discriminated whether the focusing lens group has been driven in the same direction as the last time (Step #89). If the driving direction has been the same (YES in Step #89), it is further discriminated whether the remaining driving amount is smaller than a specified driving amount Lr2 (>Lr1, e.g., 1000 μm) (Step #91).

If the remaining driving amount is smaller than the specified driving amount Lr2 (YES in Step #91), it is judged that the focusing lens group has almost been moved in the vicinity of realizing the in-focus condition and this routine proceeds to Step #69 in which the focusing lens group is driven the remaining driving amount to attain an in-focus condition. Thereafter, the exposure processing is carried out after the switch S2 is turned on (Steps #71 to #75).

If the driving direction is not the same (NO in Step #89), it is further discriminated whether the remaining driving amount is smaller than the predetermined driving amount Lr1 (Step #93). If the remaining driving amount is smaller than Lr1 (YES in Step #93), it is judged that the focusing lens group has almost been moved in the vicinity of realizing the in-focus condition and this routine proceeds to Step #69 in which the focusing lens group is driven the remaining driving amount to attain an in-focus condition. Thereafter, the exposure processing is carried out after the switch S2 is turned on (Steps #71 to #75).

This routine proceeds to Step #95 if the object image is in low contrast state (YES in Step #85), if the remaining driving amount is not smaller than Lr2 after driving the focusing lens in the same direction as the last time (NO in Step #93) or if the remaining driving amount is not smaller than Lr1 after driving the focusing lens in the different direction from the last time (NO in Step #91). In Step #95 and subsequent Steps, the second or third AF control is carried out with the assist of the auxiliary light.

It is discriminated whether the built-in flash firing mode is set (Step #95). If this mode is set (YES in Step #95), a waiting period follows. This is to prevent unnecessary consumption of a main battery of the camera main body 100 by the auxiliary light emission because the built-in flash device 115 has already been fired twice to emit the auxiliary light for the metering in Steps #61 and #83.

During the waiting period, the normal passive metering is carried out repeatedly. When the reliable AF control value is obtained, it is followed by Step #7 (see FIG. 5) and the above-mentioned operations in Step #9 and subsequent Steps are carried out in accordance with the newly obtained AF control value.

Figure 6A:
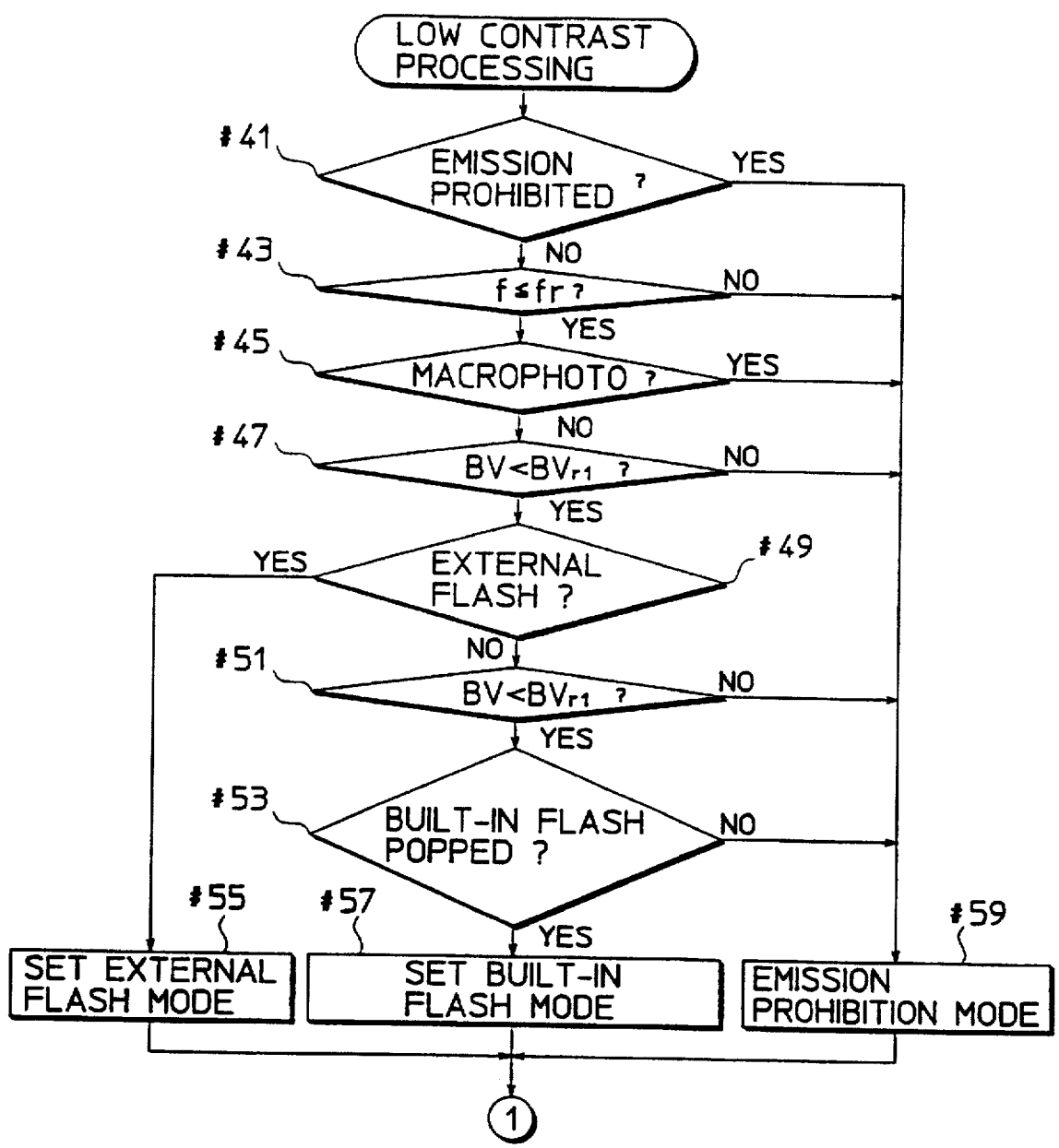
FIGS. 6A to 6D are flow charts showing a subroutine "Low Contrast Processing"
Figure 6B:
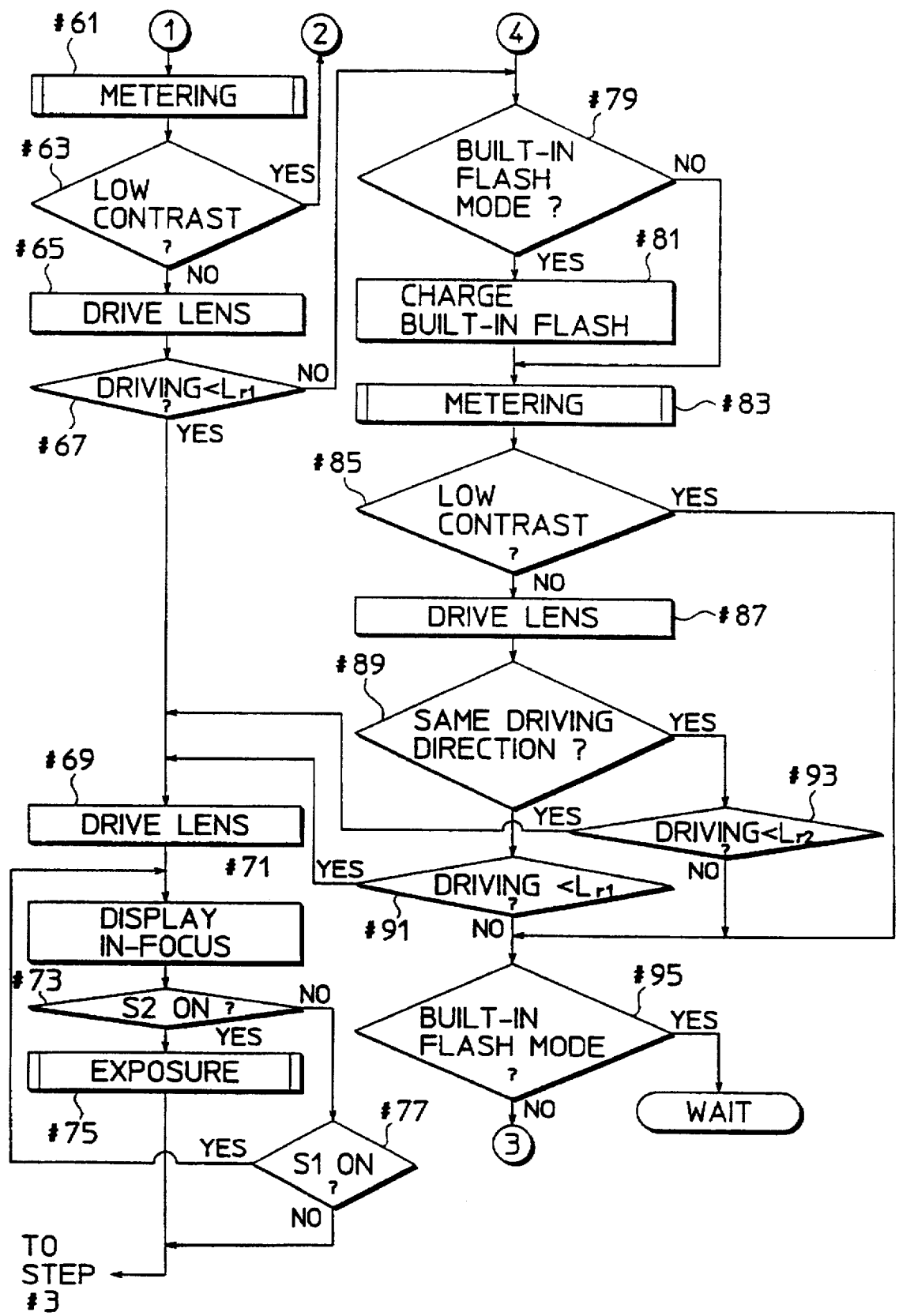
Figure 6C:
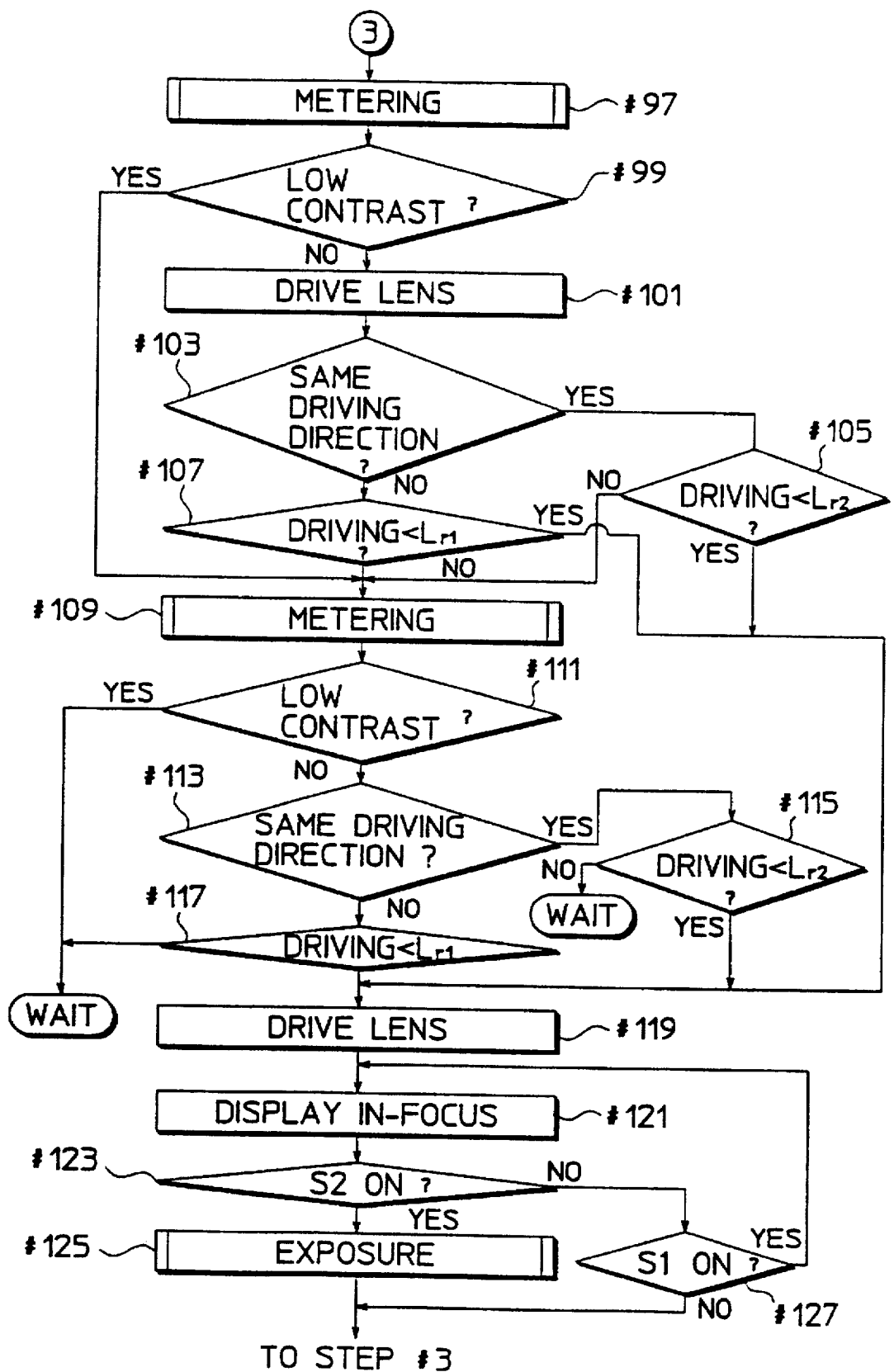

If the built-in flash firing mode is not set, i.e., the external flash firing mode is set (NO in Step #95), the second AF control is carried out with the assist of the auxiliary light in Steps #97 to #107, #119 to #127 (see FIG. 6C).

Steps #97 to #107 correspond to Steps #83 to #93 and Steps #119 to #127 correspond to Steps #69 to #77. In these Steps, the operations similar to the above-mentioned ones are carried out. Accordingly, in the external flash firing mode, the focusing lens group of the taking lens 201 is driven in accordance with the AF control value obtained as a result of the second auxiliary light assisted AF control. If the focusing lens group has been driven in the vicinity of realizing an in-focus condition (Step #105, YES in Step #107), the specified photographing similar to the above is conducted (Steps #121 to #127) after accurately driving the focusing lens group to attain an in-focus condition (Step #119).

On the other hand, if the focusing lens group has not been driven in the vicinity of realizing an in-focus condition after being driven in accordance with the AF control value obtained as a result of the second auxiliary light assisted AF control (Step #105, NO in Step #107), the metering shown in FIG. 7 is carried out again (Step #109) and the third AF control is carried out with the assist of the auxiliary light in Steps #111 to #117.

Steps 109 to #117 correspond to Steps #83 to #93, and the operations similar to the above-mentioned one are carried out in these Steps. The focusing lens group of the taking lens 201 is driven in accordance with the AF control value obtained as a result of the third auxiliary light assisted AF control. If the focusing lens group has been driven in the vicinity of realizing an in-focus condition (Step #115, YES in Step #117), the specified photographing similar to the above is conducted (Steps #121 to #127) after accurately driving the focusing lens group to attain an in-focus condition (Step #119).

On the other hand, if the focusing lens group has not been driven in the vicinity of realizing an in-focus condition after being driven in accordance with the AF control values obtained as a result of the third auxiliary light assisted AF control (Step #115, NO in Step #117), the above-mentioned waiting period follows to prevent consumption of the battery of the external flash device by the auxiliary light emission.

Figure 6D:
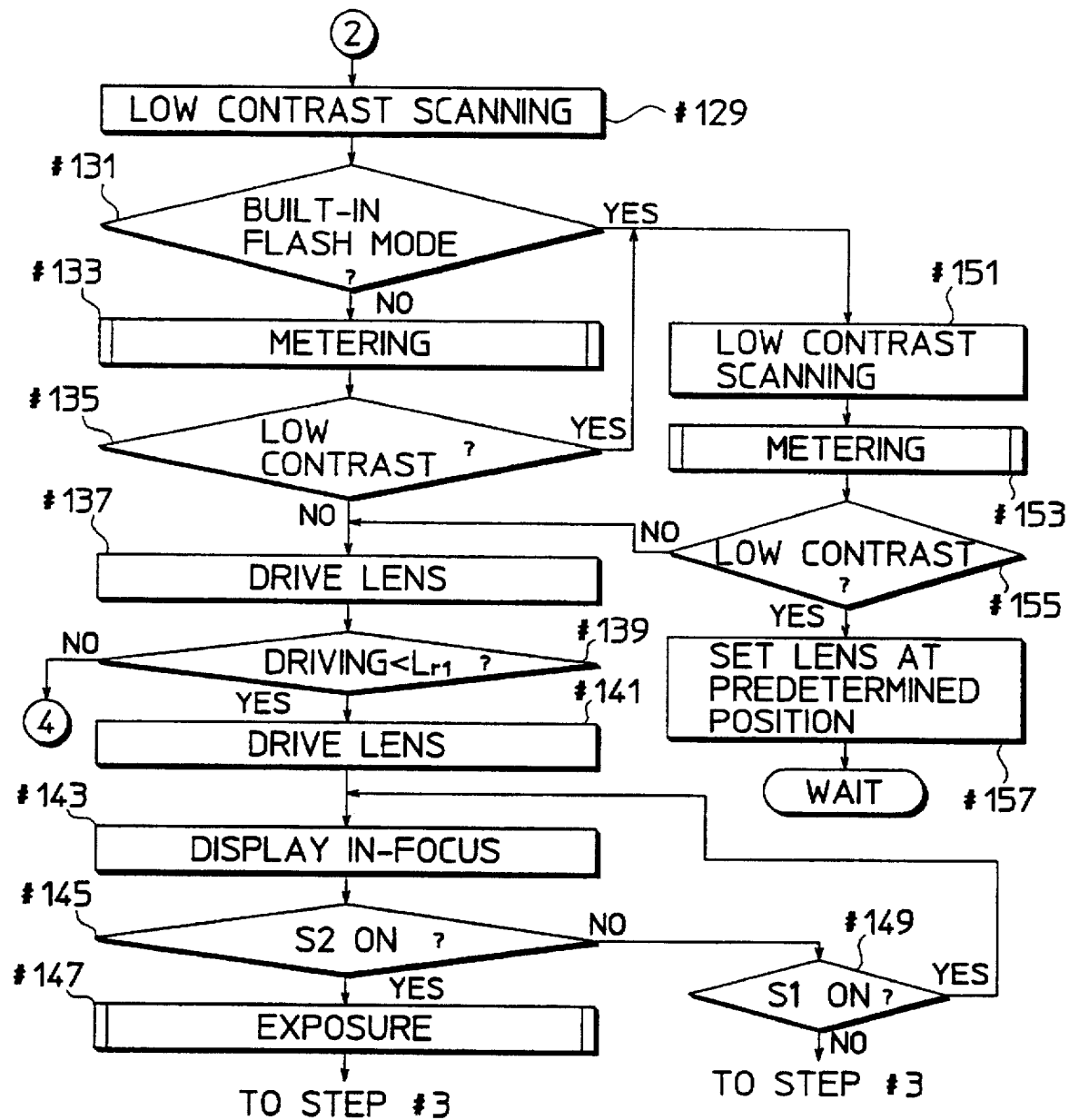

Referring back to FIG. 6B, if the AF control value initially obtained by the focusing condition detection indicates the low contrast state (YES in Step #63), it is followed by Step #129 (see FIG. 6D). In Step #129, a low contrast scanning is started in which the focusing lens group of the taking lens 201 is driven to search an in-focus condition while the passive metering is carried out. During the low contrast scanning, the focusing lens group is, for example, first driven to a telephoto limit to search an in-focus condition. If the telephoto limit is reached without finding the in-focus condition, the driving direction of the focusing lens group is reversed toward a wide limit and the in-focus condition is searched again.

Subsequently, it is discriminated whether the built-in flash firing mode is set (Step #131). If this mode is not set, i.e., the external flash firing mode is set (NO in Step #131), the AF control value is calculated by firing the external flash device to emit the auxiliary light (Step #133).

It is discriminated based on the calculated AF control value whether the object image is in low contrast state (Step #135). If the object image is not in low contrast state (NO in Step #135), the focusing lens group of the taking lens 201 is driven to attain an in-focus condition in accordance with the AF control values (Step #137). After this driving control, it is discriminated whether the remaining driving amount is smaller than the predetermined driving amount Lr1 (Step #139). If the remaining driving amount is smaller than Lr1 (YES in Step #139), the focusing lens group is driven by the remaining driving amount upon judgment that the focusing lens group has almost been moved in the vicinity of realizing the in-focus condition (Step #141). Thereafter, the specified photographing similar to the above is carried out (Steps #143 to #149).

If the remaining driving amount is not smaller than Lr1 (NO in Step #139), it is followed by Step #79. Then, the second AF control is carried out with the assist of the auxiliary light emission from the external flash device in Steps #79 to #127.

If the built-in flash firing mode is set (YES in Step #131) or if the object image in low contrast state (YES in Step #135), the low contrast scanning is carried out again to calculate the AF control value (Steps #151, #153). It is then discriminated whether the object image is in low contrast state based on the calculated AF control value (Step #155). If the object image is not in low contrast state (NO in Step #155), it is followed by Step #137. The AF control and the exposure control are carried out in accordance with the AF control value in the same way as described above in Steps #137 to #149.

If the object image is in low contrast (YES in Step #155), the waiting period follows after the focusing lens group of the taking lens 201 is set at a predetermined position (Step #157).

Figure 9:
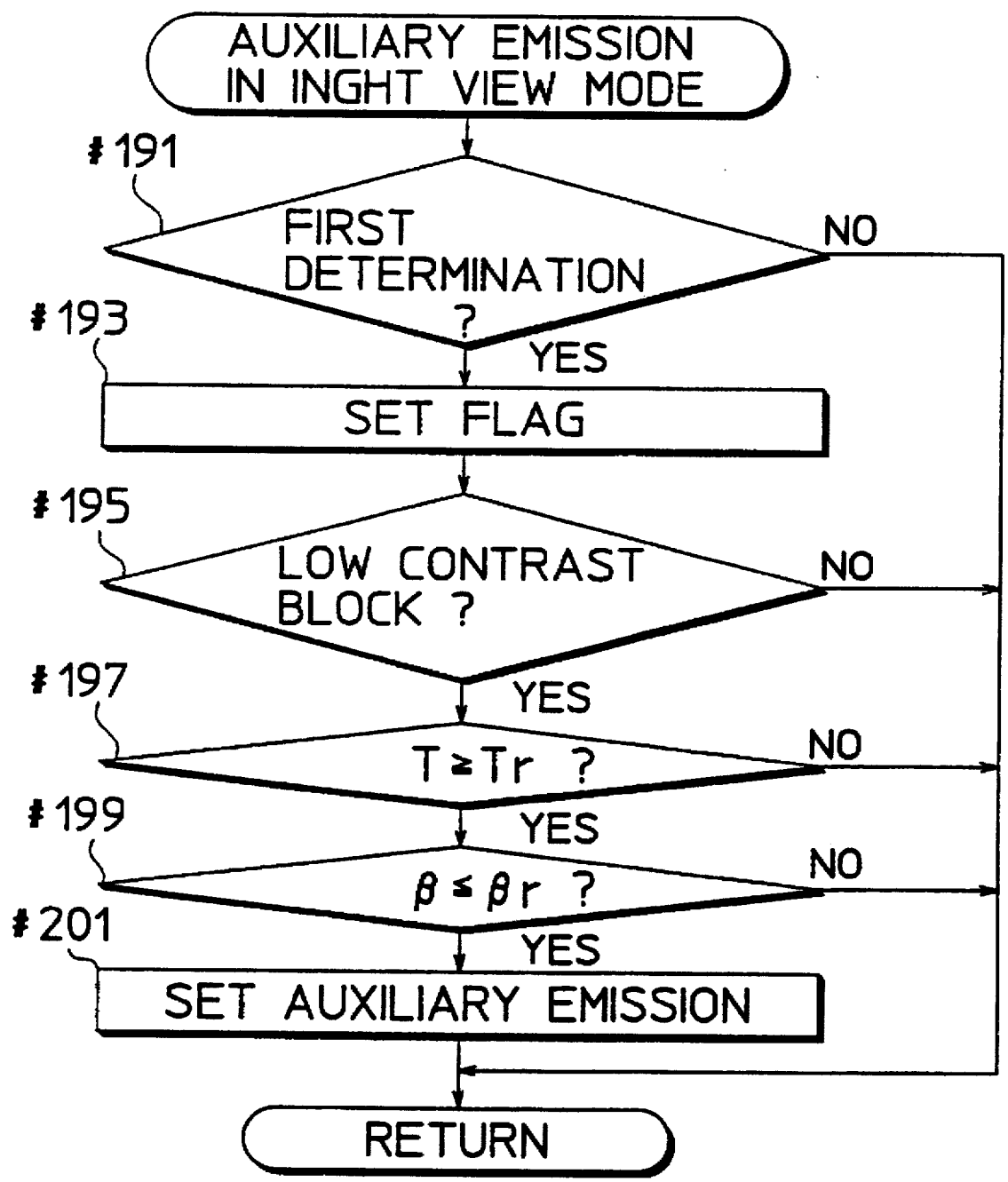
FIG. 9 is a flow chart showing a subroutine "Auxiliary Light Emission Determination in Night View Mode"

It is described with reference to a subroutine "Auxiliary Light Emission Determination in Night View Mode" shown in FIG. 9 how discrimination is made as to whether the auxiliary light should be emitted in the night view mode.

This discrimination is made as to whether the auxiliary light emission for the AF control is necessary for the photographing operation in the night view mode.

When the night view mode is set, the photographing scene is likely to be such that a main object such as a person is standing at night in front of bright background such as buildings adorned with electric lights (hereinafter, referred to as a night scene). In the night scene, when the AF control is carried out to focus the taking lens 201 at the main object by conducting the normal passive metering, the taking lens 201 may be erroneously focused at the background since the background is brighter than the main object.

Figure 10A:
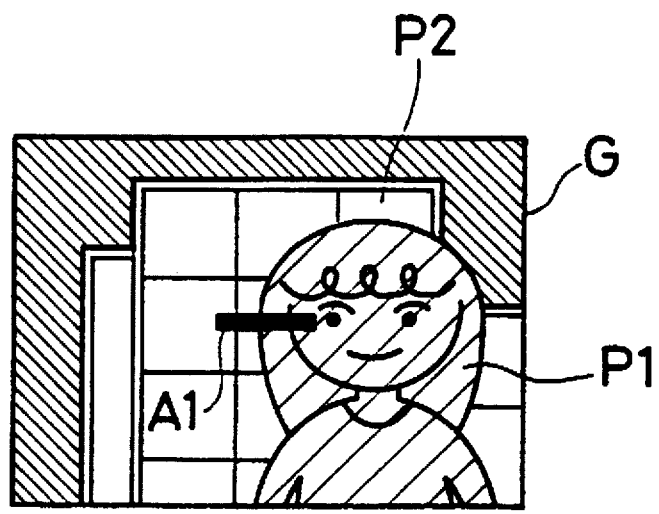
FIGS. 10A and 10B are diagram showing examples of a photographing field of a night scene.
Figure 10B:
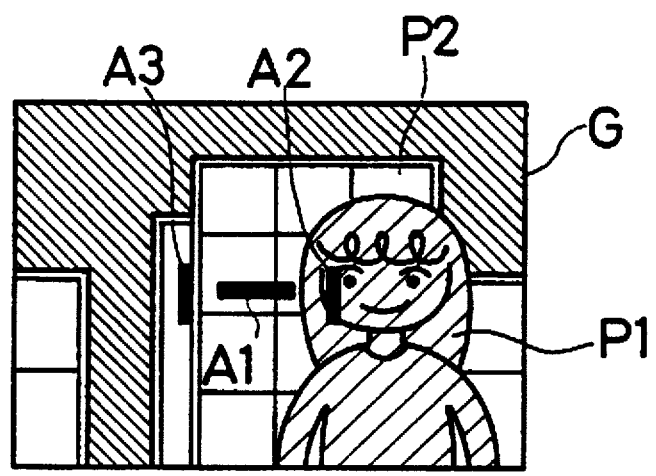

FIGS. 10A and 10B are diagram showing examples of a photographing field of a night scene, FIG. 10A showing the photographing field of a camera provided with an AF function of single metering system and FIG. 10B showing the photographing field of a camera provided an AF function of multiple metering system.

The camera provided with an AF function of single metering system has a single metering area A1 in the middle of a field G. If the field G is such that an image of a main object (person) P1 is partially included in the metering area A1 and an image of a background (building) P2 is included in the remaining part of the metering area A1 as shown n FIG. 10A, the Af control value is calculated based on the pixel data corresponding to the image of the background P2 since the image of the background P2 is brighter than that of the main object P1. Accordingly, the focusing lens group of the taking lens 201 is focused at the background P2, with the result that the main object P1 is out of focus in a final picture.

On the other hand, the camera provided with an AF function of multiple metering system has three metering areas A1, A2 and A3 in the middle of the field. The AF control value is calculated for each of the metering areas A1 to A3 and the AF control is carried out based on the AF control value obtained, for example, in any of the metering areas.

When the field G is such that the image of the main object (person) P1 is included in the metering area A2 and that of the background (building) P2 is included in the metering areas A1 and A3, the AF control value obtained in the metering area A2 is judged to be less reliable than those obtained in the metering areas A1 and A3 because the image of the background P2 is brighter than that of the main object P1. As a result, the taking lens 201 is focused in accordance with the AF control values obtained in the metering area A1 or A3. Thus, the taking lens 201 is focused at the background P2 and the main object P1 is out of focus in a final picture as in the single metering system.

Accordingly, in this embodiment, when the night view is set, the flash device is fired to emit the auxiliary light for the AF control so that the AF control is carried out to securely focus the taking lens 201 at the main object.

When the subroutine "Auxiliary Light Emission Determination in Night View" is called, it is discriminated whether this is the first auxiliary light emission determination based on the state of an auxiliary light flag (Step #191). If the discrimination is in the affirmative (YES in Step #191), the auxiliary light flag is set (Step #193) and it is discriminated whether any of the blocks B1 to B3 of the AF sensor 106 is in low contrast state (hereinafter referred to as a low contrast block) (Step #195).

If a low contrast block exists (YES in Step is discriminated whether an integration time T of the AF sensor 106 is not shorter than a predetermined reference time Tr (e.g., 100 ms) (Step #197). If T≧Tr (YES in Step #197), it is further discriminated whether the magnification β is smaller than a predetermined magnification βr (e.g., 1/100) (Step #199).

If β≦βr (YES in Step #199), the auxiliary light emission for the AF control by the flash device is required (Step #201) and this subroutine returns.

This subroutine returns without requiring the auxiliary light emission if the discrimination processing is not the first one (NO in Step #191), if there exists no low contrast block (NO in Step #195), if T<Tr (NO in Step #197), or if β>βr (NO in Step #199).

Since the AF control value is considered to have high reliability when no low contrast block exists in the AF sensor 106, the flash device is not fired to emit the auxiliary light.

The speed at which electric charges are stored in the AF sensor 106 is in proportion to the object brightness and the integration time is in inverse proportion thereto. Accordingly, the lower the object brightness, the longer the integration time. The predetermined time Tr corresponds to a threshold value of the object brightness which enables the AF control without the auxiliary light emission. When the integration is shorter than the predetermined time Tr, the flash device is not fired to emit the auxiliary light since the object is not so dark as to require the auxiliary light.

The predetermined magnification βr corresponds to the flash light coverage. If the magnification β is greater than the predetermined magnification βr, the flash device is not fired to emit the auxiliary light since the auxiliary light emission by the flash device has no effect on the object brightness.

The auxiliary light flag set in Step #193 is reset after the switch S1 is turned off.

Figure 11:
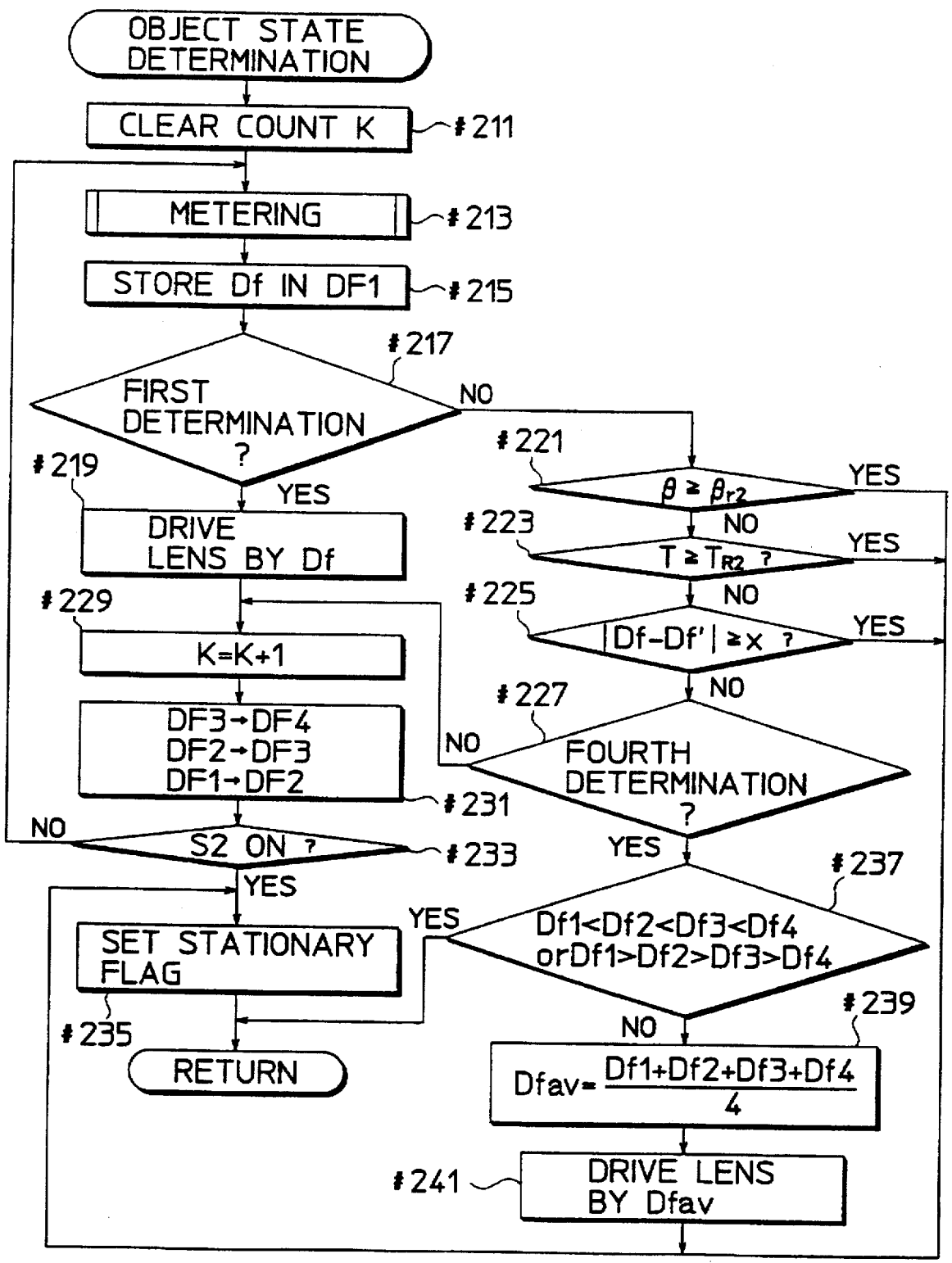
FIG. 11 is a flow chart showing a subroutine "0.3 Seconds Object State Determination Processing"

A 0.3 seconds object state determination processing is described next with reference to a flow chart shown in FIG. 11.

This processing is carried out to discriminate whether the object is stationary or moving.

When the subroutine "0.3 Seconds Object State Determination Processing" is called, a counter K is cleared (Step #211) and the metering is performed (Step #213). An AF control value Df obtained as a result of the motoring is stored in a predetermined storage region DF1 of a RAM built in the AF controller 108 (Step #215). It is then discriminated whether this is the first object state determination processing (Step #217). If the discrimination result is in the affirmative (YES in Step #217), the focusing lens group of the taking lens 201 is driven in accordance with the AF control value Df (Step #219). The focusing lens group is driven so as to use the in-focus condition detected for the first determination processing as a reference position of the focusing lens group in this determination processing.

After the count value of the counter K is incremented by 1 (Step #229), the AF control values Df1, Df2, Df3 stored in the storage regions DF1 to DF3 of the RAM are shifted and stored in the neighboring storage regions DF2 to DF4, respectively (Step #231). In other words, the AF control values Df3, Df2, Df1 are read from the storage regions DF3, DF2, DF3 and restored in the storage regions DF4, DF3, DF2, respectively.

It is then discriminated whether the switch S2 is on (Step #233). If the switch S2 is on (YES in Step #233), this subroutine returns after setting a stationary flag (Step #227). If the switch S2 is off (NO in Step #233), it is followed by Step #213 to carry out the determination processing again. The stationary flag is adapted to discriminate the state of the object. If the stationary flag is set, it means that the object is stationary.

If the determination processing is not the first time (NO in Step #217), the following discriminations are made one after another: whether the magnification β is not smaller than a predetermined magnification βr2 (e.g., 1/25) (Step #221); whether the integration time T is not shorter than a predetermined time Tr2 (e.g., 40 ms) (Step #223); whether a difference ΔDf (=Df−Dr') between the previous AF control value Dr' and the current AF control value Df is not smaller than a predetermined amount x (e.g., 300 μm) (Step #225); and whether this determination processing is the fourth time based on the count value of the counter K (Step #227).

It is followed by Step #235 upon judgment that the object is stationary if β≧βr2 (YES in Step #221), T≧Tr2 (YES in Step #223), or the difference Δdf is not smaller than x (YES in Step #225). Then, this subroutine returns after setting the stationary flag (Step #235).

It is followed by Step #229 if β<βr2 (NO in Step #221), T<Tr2 (NO in Step #223), the difference ΔDf is smaller than x (NO in Step #225), and this determination processing is not the fourth time (NO in Step #227). Then, the determination processing similar to the above is continued.

When the determination processing is carried out four times until the switch S2 is turned on (YES in Step #227), it is discriminated whether the AF control values Dfi (i=1, 2, 3, 4) stored in the respective storage regions DFi (i=1, 2, 3, 4) of the RAM are such that Df1<Df2<Df3<Df4 or Df1>Df2>Df3>Df4 (Step #237). If Df1<Df2<Df3<Df4 or Df1>Df2>Df3>Df4 (YES in Step #237), this subroutine returns upon judgment that the object is not stationary.

If the relationship of the AF control values DFi is other than Df1<Df2<Df3<Df4 or Df1>Df2>Df3>Df4 (NO in Step #237), an average value Dfav (=(Df1+Df2+Df3+Df4)/4) of the four AF control values is calculated (Step #239). The focusing lens group of the taking lens 201 is driven by this average value Dfav (Step #241). Thereafter, this subroutine returns after setting the stationary flag (Step #275).

A movement prediction AF processing is described with reference to a flow chart show in FIG. 12. When the subroutine "Movement Prediction AF" is called, the metering is performed to calculate the AF control value (Step #251). Subsequently, a metering interval and an average defocusing speed are calculated (Steps #253 and #255).

The metering interval is an interval between the previous metering and the present metering. This calculation is made in accordance with a subroutine "Metering Interval Calculation" shown in FIG. 13.

The metering is performed by storing electric charges for a specified time corresponding to the object brightness in the AF sensor 106. In this embodiment, a middle time of the integration in each metering is set as a reference time and an interval between the reference times of the respective meterings is calculated as a metering interval.

In other words, a time difference ΔT (=Tm−Tm') between the integration middle time Tm of the Af sensor 106 for the present metering and the integration middle time Tm' of the AF sensor 106 for the previous metering is calculated as a metering interval. This subroutine returns after the previous integration middle time Tm' is replaced with the current Integration middle time Tm (Step #283).

The average defocusing speed is an average speed of the focusing surface of the object image according to the movement of the object.

Figure 15:
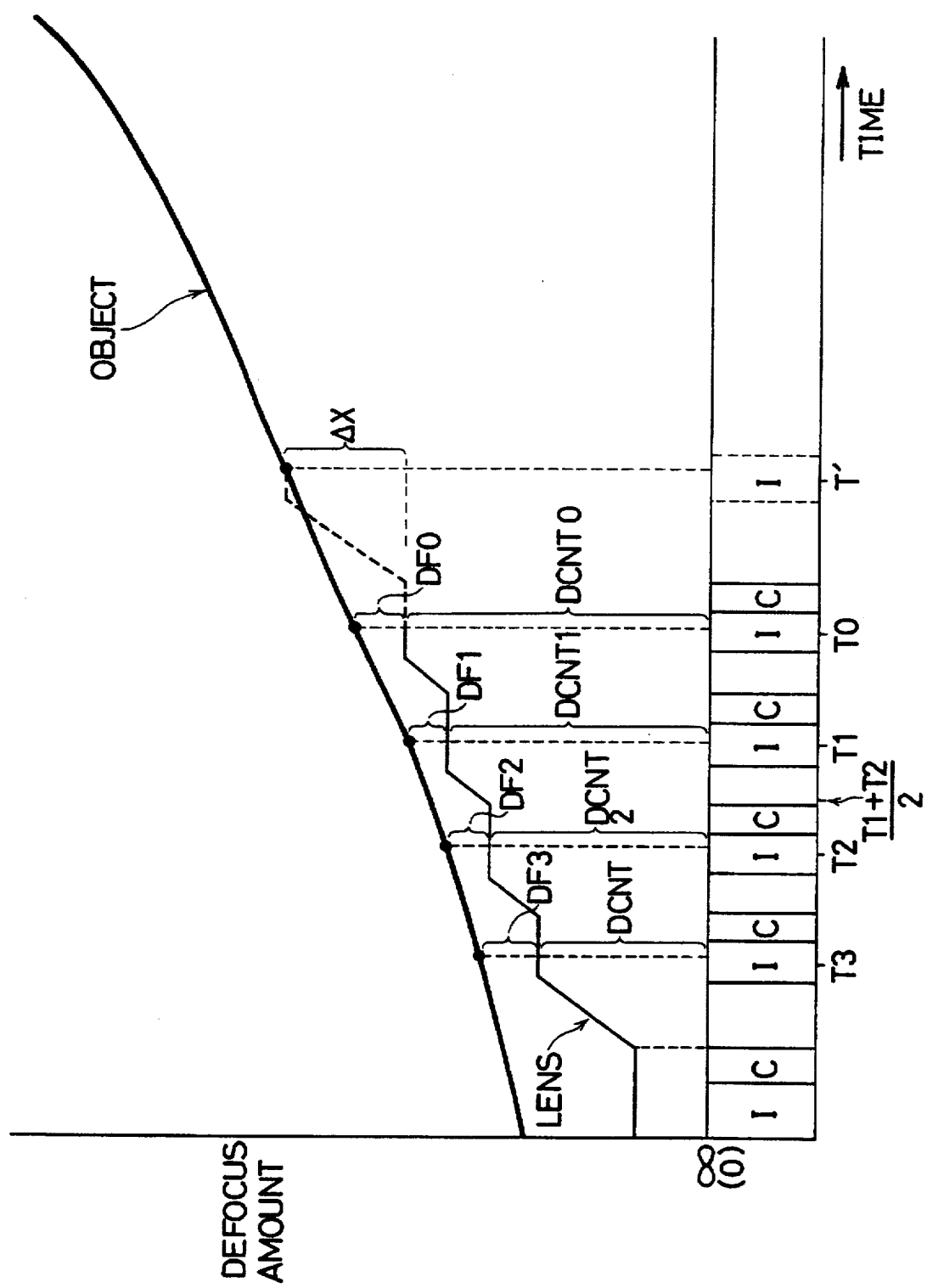
FIG. 15 is a chart showing how the average defocusing speed is calculated.
Figure 16:
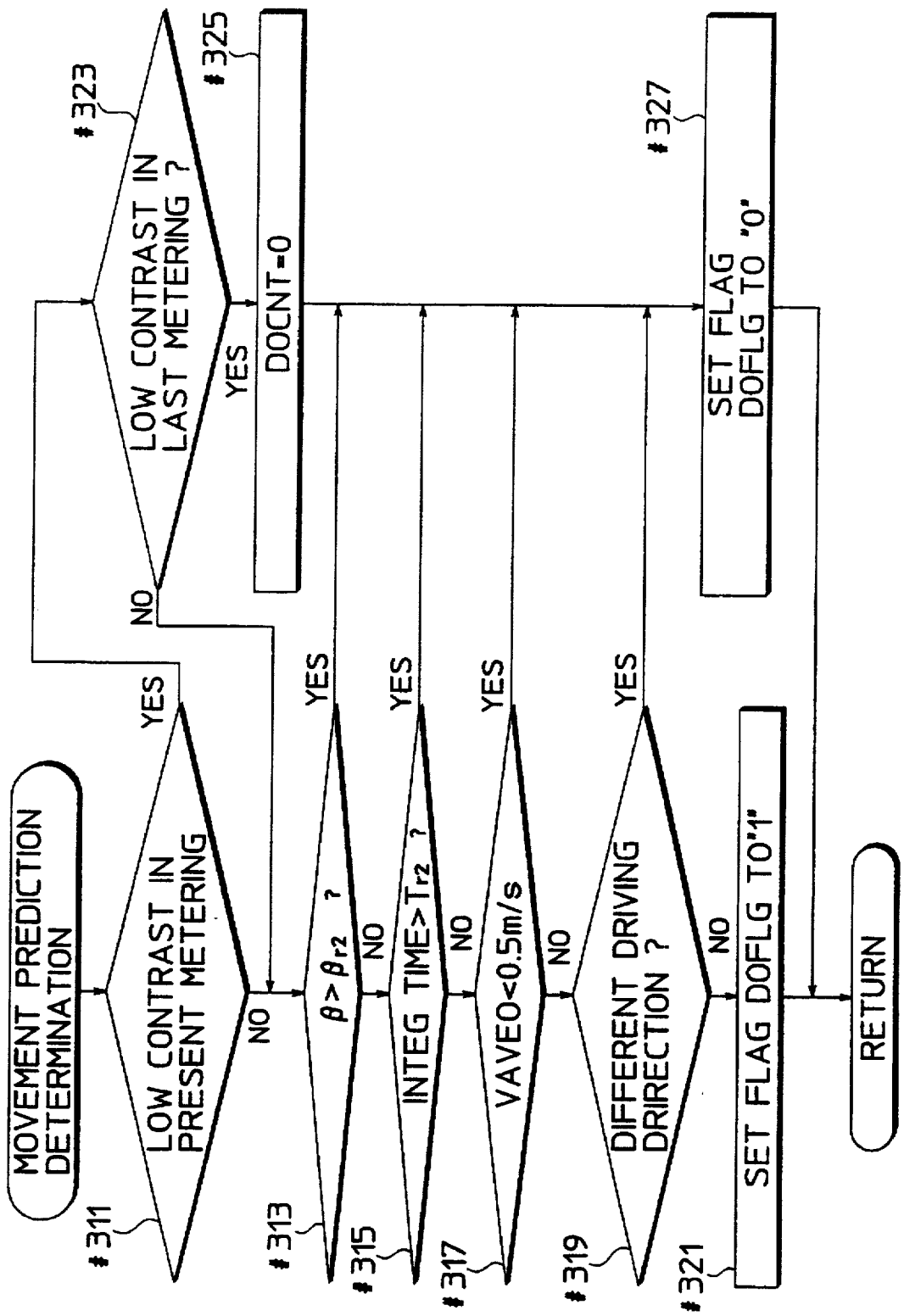
FIG. 16 is a flow chart showing a subroutine "Movement Prediction Determination"

FIG. 15 is a chart showing how the average defocusing speed is calculated. FIG. 15 shows that the focusing lens group of the taking lens 201 is moved to attain an in-focus condition while repeating the metering for the moving object. A horizontal axis represents time while a vertical axis represents a defocus amount. The letter "I" in the bottom zone in the chart indicates the integration while the letter "C" indicates the calculation.

The image of the object at a position ∞ corresponding to a wide limit of the driving range of the taking lens 201 is focused on the film surface F when the focusing lens group of the taking lens 201 is set at the wide limit of its driving range. As the object moves toward the taking lens 201, the focusing surface is shifted from the film surface F. The defocus amount corresponds to the object distance from the position ∞. The position of the object from the position ∞ as a reference position can be expressed using the defocus amount of the focusing surface of the object image. The thick line in FIG. 15 represents the position of the object whose reference position is the position ∞ as a function of the defocus amount of the focusing surface of the object image relative to the film surface F.

If the focusing lens group is moved from the wide limit in order to photograph the object standing still at the position ∞, the focusing surface of the object image shifts from the film surface F accordingly. This defocus amount corresponds to the distance of the focusing lens group from the position ∞. Thus, the position of the focusing lens group corresponding to the position ∞ can be expressed in the defocus amount of the focusing surface of the object from the film surface F.

The thin line in FIG. 15 represents the position of the focusing lens group as a function of the defocus amount, namely, a moved amount of the focusing surface of the object image when the focusing lens group is moved from where it is focused at the object at the position ∞. The relationship between the defocus amount with respect to the object, which is expressed in the thick line, and the defocus amount with respect to the lens, which is expressed in the thin line, shows that the defocus amount with respect to the object is reduced by the defocus amount with respect to the lens each moving the lens. In other words, at one point, the difference between the defocus amount expressed in the thick line and the defocus amount expressed in the thin line is the defocus amount calculated during the metering at this point.

Time T0 represents a time (integration middle time) of the present metering (0th metering), and time T' represents a time (integration middle time) of the next metering. Times T1, T2 and T3 represent times of the last, second last and third last meterings from the present metering.

DCNT0 represents the current position of the focusing lens group of the present metering, and DF0 represents the defocus amount calculated during the present metering. Similarly, DCNT1 to DCNT3 represent the positions of the focusing lens group for the corresponding meterings, and DF1 to DF3 are the defocus amounts calculated during the respective corresponding meterings. The position of the object in an arbitrary metering is expressed as a position of the focusing surface of the object image from the film surface F when the focusing lens group is at the wide limit. Thus, if the focusing lens group is at the wide limit, the position of the object is determined based on the defocus amount calculated in the metering.

However, the focusing lens group is normally not at the wide limit, the position of the object in the arbitrary metering is expressed as a sum of the defocus amount calculated in this metering and the defocus amount of the focusing surface of the object image from the film surface F.

Since the defocus amount can be expressed using the position of the focusing lens group as described above, the defocus amount DVi corresponding to the position of the object in the i-th metering (i=0, 1, 2, 3 where the larger the number, the more previously the metering was conducted) is expressed as a sum DVi (=DFi+DCNTi) of the defocus amount DFi calculated in the metering and the defocus amount DCNTi corresponding to the position of the focusing lens of the taking lens 201 as shown in FIG. 15.

Since the time and the position of the object in each metering are known, the moving speed DVF of the object between the m-th and the n-th meterings is calculated:

$$DVF=(DVm-DVn)/(Tm-Tn).$$

In this embodiment, there are calculated the moving speed DVF0 of the focusing surface of the object image between the 0th (present) and 3rd (third last) meterings, the moving speed DVF1 of the focusing surface of the object image between the 1st (last) meterings and 3rd meterings, and the moving speed DVF2 of the focusing surface of the object image between the 0th and 2nd (second last) meterings. An average value of these moving speeds DVF0, DVF1 and DVF2 is calculated as a moving speed of the focusing surface of the object image (corresponds to the average moving speed of the object).

Figure 14:
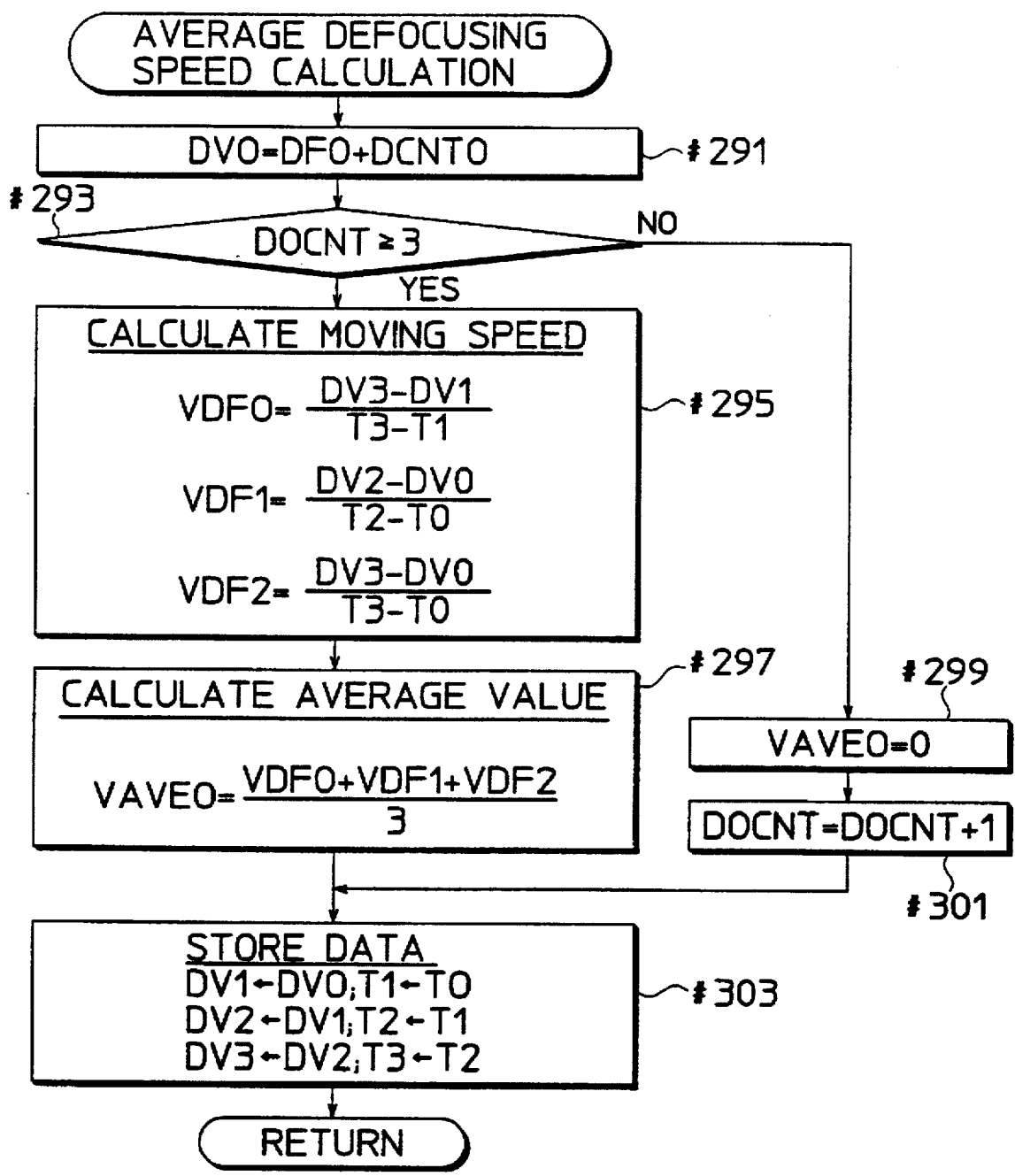
FIG. 14 is a flow chart showing a subroutine "Average Defocusing Speed Calculation"

The average defocusing speed is calculated in accordance with a subroutine "Average Defocusing Speed Calculation" shown In FIG. 14.

When the subroutine "Average Defocusing Speed Calculation" is called, the defocus amount DV0 (=DF0+DCNT0) in the present metering is calculated (Step #291).

Subsequently, it is discriminated whether a count value of a metering counter DOCNT for counting the number of metering is three or larger (Step #293). If the count value is 3 or larger (YES in Step #293), the moving speeds VDF0, VDF1, VDF2 of the object are calculated based on the defocus amounts DV1, DV2, DV3 obtained in the last three meterings, the defocus amount DV0 obtained in the present metering, and integration middle times T0, T1, T2, T3 in the respective meterings, using the following equation (5) (Step #295).

$$DVF0=(DV3-DV1)/(T3-T1) \qquad \text{[Equation 5]}$$

$$DVF1=(DV2-DV0)/(T2-T0)$$

$$DVF2=(DV3-DV0)/(T3-T0)$$

where DV0: defocus amount in the present metering
DV1: defocus amount in the last metering
DV2: defocus amount in the second last metering
T0: integration middle time in the present metering
T1: integration middle time in the last metering
T2: integration middle time in the second last metering
T3: integration middle time in the third last metering An average value of the moving speeds VDF0 to VDF2 is calculated as an average moving speed VAVE0 (=(VDF0+VDF1+VDF2)/3) of the object (Step #297).

This subroutine returns after the defocus amounts DV0 to DV3, the integration middle times T0 to T3 and the average moving speed VAVE0 are stored in the memory of the AF controller 108 (Step #303).

If the count value is smaller than 3 (NO in Step #293), it is followed by Step #303 after the defocusing speed VAVE0 is set to "0" (Step #299) and the metering counter DOCNT is incremented by 1 (Step #301).

Upon completion of the metering interval calculation and the average defocusing speed calculation, a movement prediction determination processing is carried out (Step #257). This processing is to determine whether the adjustment of the in-focus condition resulting from the movement of the object is necessary based on the photographing conditions or the like, and is carried out in accordance with a subroutine "Movement Prediction Determination Processing" shown in FIG. 16.

When this subroutine is called, it is discriminated whether the result of the present metering represents the low contrast state (Step #311). If the discrimination result is in the affirmative (YES in Step #311), it is further discriminated whether the result of the last metering also represents the low contrast state (Step #323). If the discrimination result is in the affirmative (YES in Step #323), this subroutine returns after the metering counter DOCNT is reset to "0" (Step #325) and an in-focus condition correction flag DOFLG is reset to "0" (Step #327).

The flag DOFLG is adapted to discriminate whether the calculated defocus amount DF needs to be corrected by predicting the movement of the object. If the flag DOFLG is set to "1", the defocus amount DF is corrected (see Step #265).

Unless the result of the last metering represents the low contrast state (NO in Step #323), the following discriminations are made one after another: whether the magnification β is greater than the predetermined magnification βr2 (e.g., 1/25) (Step #313); whether the integration time T of the AF sensor 106 is longer than the predetermined time Tr2 (e.g., 40 ms) (Step #315); whether the average moving speed VAVE0 of the object is lower than a predetermined speed (e.g., 0.5 mm/s) (Step #317); and whether focusing lens group of the taking lens 201 has been driven in the direction different from the last time (Step #319).

This subroutine returns after the flag DOFLG is set to "1" (Step #321) if β≦β (NO in Step #313), T≦Tr2 (NO in Step #315), VAVE0<the predetermined speed (NO in Step 317), and the focusing lens group has been driven in the same direction as the last time (NO in Step #319).

This subroutine returns after the flag DOFLG is set to "0" (Step #327) if β>β (YES in Step #313), T>Tr2 (YES in Step #315), VAVE0≧the predetermined speed (YES in Step #317), or the focusing lens group has been driven in the direction different from the last time (YES in Step #319).

Figure 12:
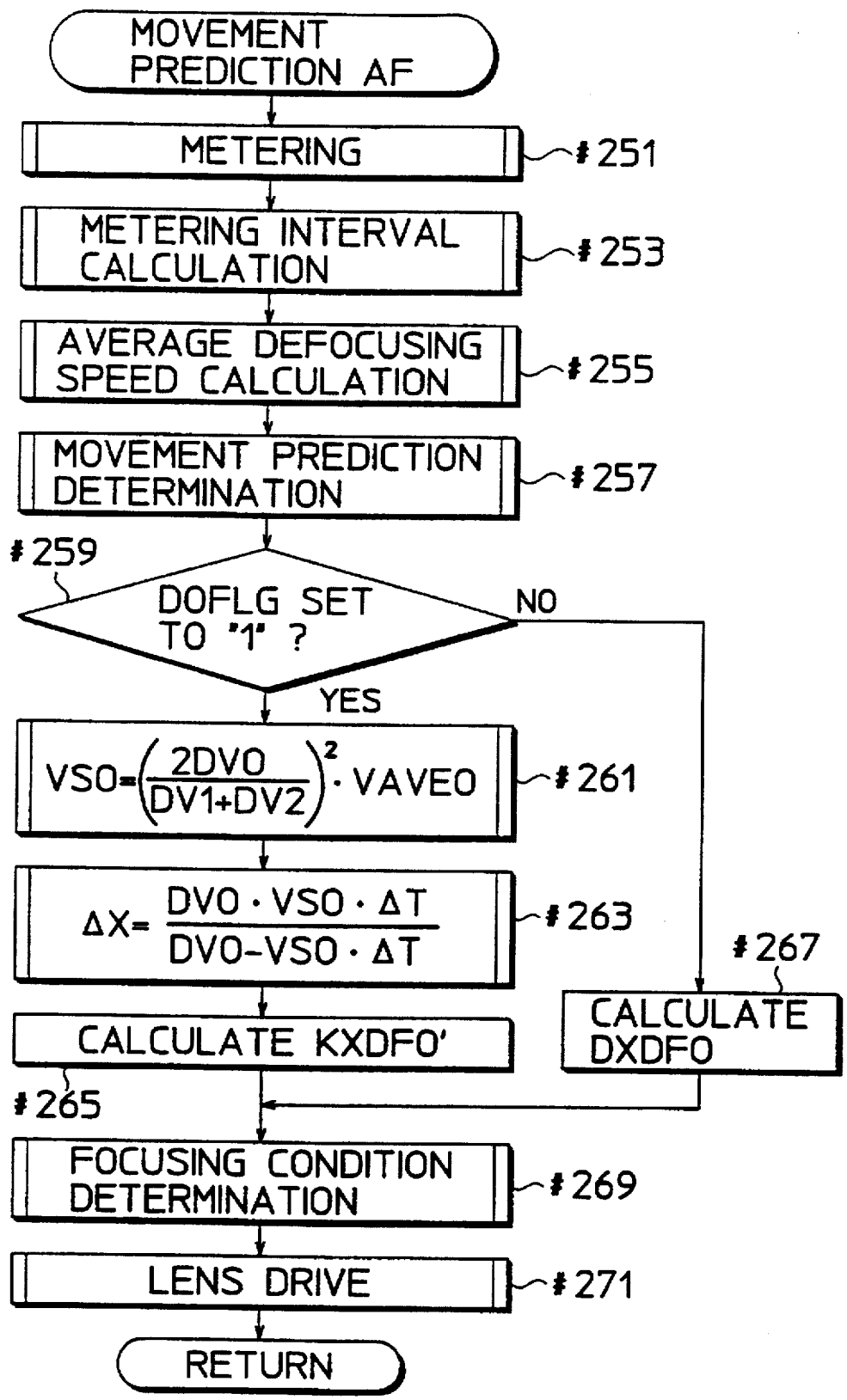
FIG. 12 is a flow chart showing a subroutine "Movement Prediction AF"
Figure 13:
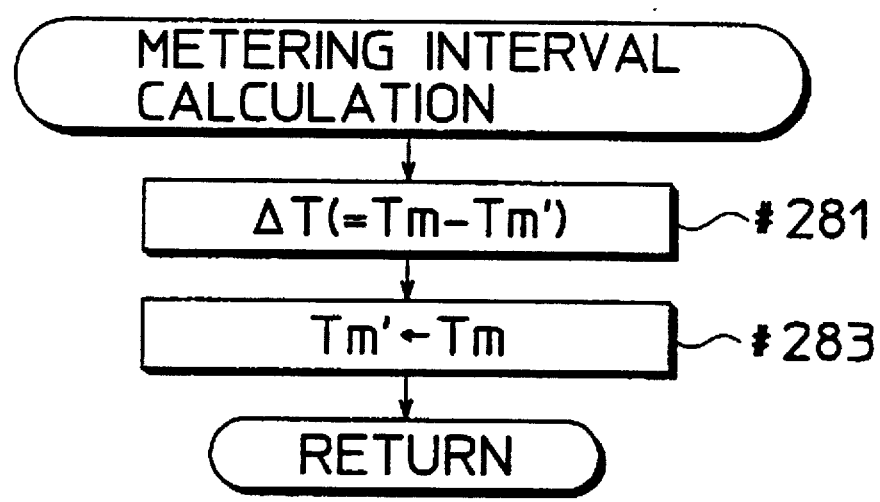
FIG. 13 is a flow chart showing a subroutine "Metering Interval Calculation"

Upon completion of the movement prediction determination, it is discriminated whether the object is moving based on the state of the flag DOFLG (Step #259 in FIG. 12). If the object is moving (the flag DOFLG is set) (YES in Step #259), a current moving speed VS0 of the object image is calculated (Step #261).

Since the average moving speed VAVE0 of the object is the average of the moving speeds VDF0 to VDF2, the object is considered to be moving at the speed VAVE0 around the time (T1+T2)/2.

The relationships expressed in the following equation (6) are established if the defocus amount at time (T1+T2)/2 is approximated to (DV1+DV2)/2, Vm and βm denote the moving speed and magnification at time (T1+T2)/2, VS0 and β0 denote the moving speed and magnification at time T0, and f denotes the focal length of the taking lens 201.

$$VAVE0 = -\beta m^2 \times Vm \qquad \text{[Equation 6]}$$

$$VS0 = -\beta 0^2 \times Vm$$

$$DV0 = f \times \beta 0$$

$$f \times \beta m = (DV1+DV2)/2$$

From the relationships defined in the equation (6), the following relationships can be obtained:

$$VS0 = (\beta 0/\beta m)^2 \times VAVE0,$$

$$\beta 0/\beta m = 2DV0/(DV1+DV2).$$

Thus, the moving speed VS0 of the focusing surface of the object image in the present metering is calculated using the following equation (7).

$$VS0 = (2DV0/(DV1+DV2))^2 \times VAVE0 \qquad \text{[Equation 7]}$$

Subsequently, a correction amount ΔX is calculated (Step #263). The movement prediction is to predict the position of the moving object in the next metering and to obtain an AF control value for driving the focusing lens of the taking lens 201 to attain an in-focus condition for the object at that position.

The relationship defined in the following equation (8) is established if D denotes the distance from the taking lens 201 to the object. V denotes the moving speed of the object. X denotes the defocus amount of the object at the current position from the position ∞, v denotes the moving speed of the focusing surface of the object image, and β denotes the magnification.

$$v = -\beta^2 \times V \qquad \text{[Equation 8]}$$

$$f^2 = X \times D$$

If ΔD denotes a shift amount of the distance D within a very short period Δt, ΔX denotes a shift amount of the distance X, $f^2 = (X+\Delta X) \times (D+\Delta D)$. Thus, the shift amount ΔD is expressed in the following equation (9).

$$\Delta D = f^2/(X+\Delta X) - f^2/X \qquad \text{[Equation 9]}$$

The change ΔX can be expressed as in the equation (10) from the equations (8) and (9).

$$\Delta X = (X \times V \times \Delta t)/(X - V \times \Delta t) \qquad \text{[Equation 10]}$$

By putting the metering interval ΔT calculated in Step #253, the current average moving speed VS0 of the focusing surface of the object image calculated in Step #255, the defocus amount DV0 of the object at the current position from the position ∞ into the equation (10), the shift amount ΔX can be expressed as ΔX=(DV0×VS0×ΔT)/(DV0−VS0×ΔT)).

Subsequently, the AF control value is calculated (Step #265). The shift amount ΔX is a correction amount for the current defocus amount DF0 obtained as a result of metering conducted to the moving object. Accordingly, the AF control value (K×DF0') in the movement prediction AF is calculated from the defocus amount DF0' (=DF0+ΔX) and conversion factor K.

After the focusing condition determination is made based on the calculated AF control value (Step #269), the focusing lens group of the taking lens 201 is driven to attain an in-focus condition in accordance with the AF control value (Step #271).

If the object is discriminated not to be moving, i.e., the flag DOFLG is set to "0" (NO in Step #259), the AF control value (D×DF0) is calculated based on the currently calculated defocus amount DF0 without calculating the shift amount ΔX and correcting the defocus amount DF0 with the shift amount ΔX (Step #267). After the focusing condition determination is made based on this AF control value (Step #269), the focusing lens group of the taking lens 201 is driven to attain an in-focus condition in accordance with the AF control value (Step #271).

The movement prediction AF processing is basically carried out during the photographing preparation (i.e., when the switch S1 is on). However, this processing is also executable when the switch S2 is turned on in Steps #29 (see FIG. 5), #33 and #35 to conduct the exposure control.

In this case, a shift amount ΔX' of the focusing surface of the object image resulting from movement of the object is calculated during a time lag between the start of the exposure control and the start of the actual exposure (a time lag resulting from the processing of moving the main mirror 102 to a retracted position and driving the focusing lens group of the taking lens 201). The AF control values are corrected based on the shift amount ΔX'. The shift amount ΔX' is calculated by substituting the lag time ΔTr for the metering interval ΔT into the equation for obtaining the shift amount ΔX: $\Delta X' = (DV0 \times VS0 \times \Delta Tr)/(DV0 - VS0 \times \Delta Tr)$.

The AF control can be executed with high accuracy by driving the focusing lens group of the taking lens 201 based on the corrected AF control value during the time lag which lasts until the exposure is actually started after the switch S2 is turned on.

There are cases where the movement of the focusing lens group is temporarily paused (e.g., several 100 ms) as a result of, for example, a forcible stop or entrance of extraneous matters into the driving system while the focusing lens group of the taking lens 201 is driven during the AF control, despite the fact that the focusing lens group has not yet reached the limit of its driving range. In this case, there is undesirable likelihood of mistakenly judging that the focusing lens group has reached the limit of its driving range and stopping the focusing lens group at that position. In consideration of this, in this embodiment, the limit check processing is carried out to check whether or not the focusing lens group has reached the limit of its driving range during the lens drive control.

Specifically, the limit check processing in this embodiment is as follows. When the focusing lens group is stopped during the drive control of the drive motor M, a trial is made to drive the drive motor M again by setting the drive control value (rotating speed) of the drive motor M larger than the minimum rotating speed. Unless this trial results in movement of the focusing lens group, it is judged that the focusing lens group has reached the limit position. On the other hand, if the above trial results in movement of the focusing lens group, the AF control is continued upon judgment that the focusing lens group has not yet reached the limit position.

Figure 17:
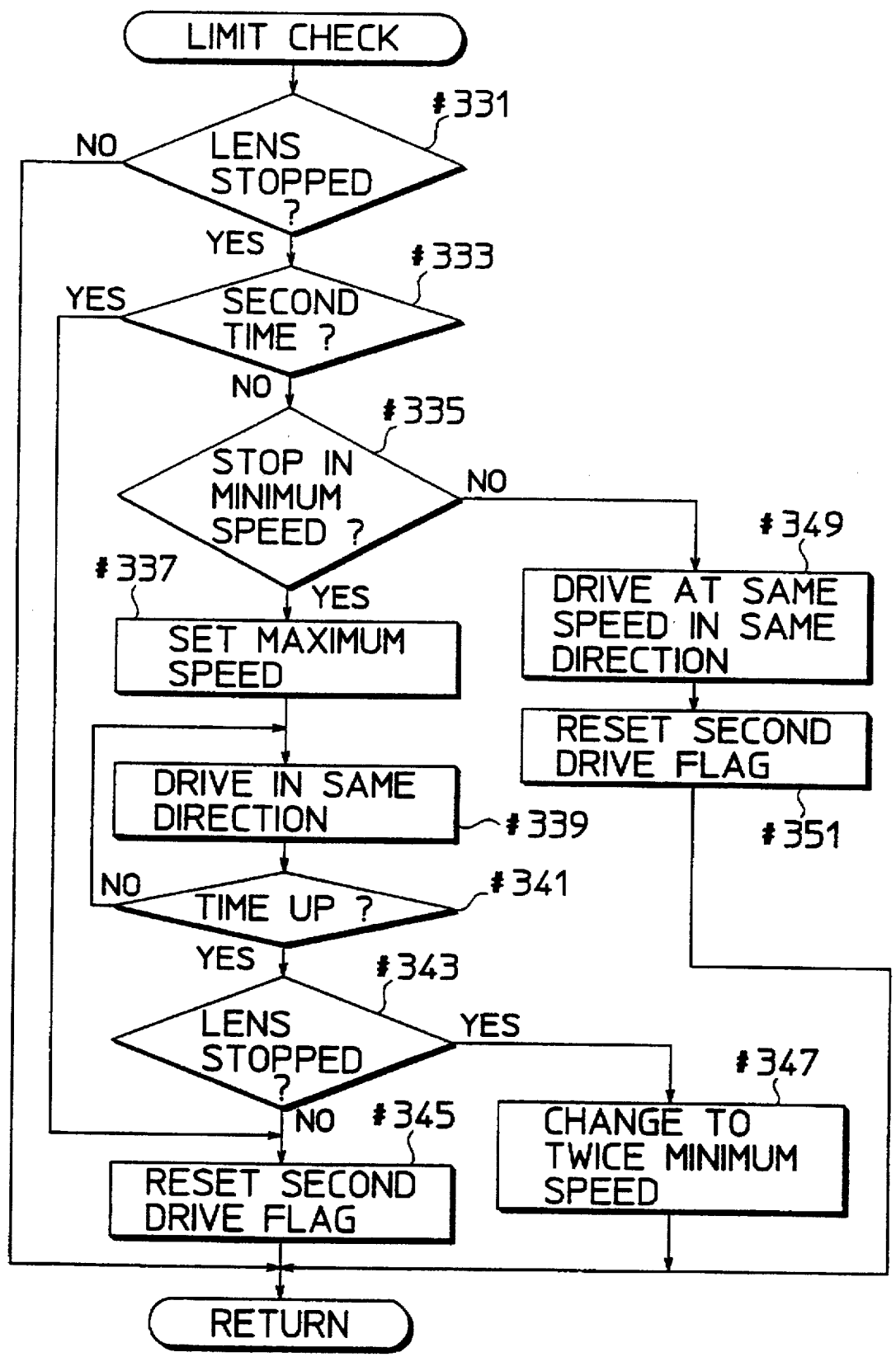
FIG. 17 is a flow chart showing a subroutine "Limit Check".

The limit check processing is carried out in accordance with a subroutine "Limit Check" shown in FIG. 17. This processing is carried out in a specified cycle while the focusing lens group is controllably driven (during the lens drive control shown in FIGS. 5, 6B to 6D, 11 and 12).

When the subroutine "Limit Check" is called, it is discriminated whether the focusing lens group of the taking lens 201 has been stopped during the drive control of the drive motor M (Step #331). Unless the focusing lens group has been stopped, i.e., unless the drive motor M is being controllably driven (NO in Step #331), this subroutine immediately returns.

If the drive motor M has been stopped during this drive control (YES in Step #331), it is discriminated based on the state of a second drive flag whether the currently executed drive control of the drive motor M is the second time (Step #333). If the currently executed drive control is the second time (YES in Step #333), this subroutine returns after the second drive flag is reset (Step #345).

Unless the drive control of the drive motor M is the second time (NO in Step #333), it is discriminated whether the focusing lens group of the taking lens 201 has stopped during a minimum speed control. The minimum speed control is such a power application control to the drive motor M that the moving speed of the focusing lens group becomes at its minimum. The power application to the drive motor Mi is controlled in accordance with a pulse train. In the minimum speed control, for example, the power application is conducted for 2 ms and stopped for 3 ms. The power application is cyclically repeated.

If the focusing lens group has stopped during the minimum speed control (YES in Step #335), the drive control of the drive motor M is set to a maximum speed control (Step #337). The maximum speed control is executed to drive the drive motor M in the same direction only for a predetermined time (e.g., 30 ms) (Steps #339 and #341). The maximum speed control is such a power application control to the drive motor M that the moving speed of the focusing lens group becomes at its maximum.

Subsequently, it is discriminated whether the focusing lens group has started moving by the maximum speed control (Step #343). If the focusing lens group has not stopped (NO in Step #343), this subroutine returns after the second drive flag is reset (Step #345).

On the other hand, if the focusing lens group has started moving (YES in Step #343), the drive control is changed such that twice as much power as in the minimum speed control is applied to the drive motor M (Step #347). In the above example, the drive control is changed to such a pulse control that the power application to the drive motor M is cyclically conducted for 4 ms and stopped 6 sm.

If the focusing lens group has stopped during the minimum speed control (NO in Step #335), it is driven again in the same direction with the same speed control (Step #349). Then, this routine returns after the second drive flag is set (Step #351).

As described above, when the focusing lens group is stopped during the drive control of the drive motor M, the following Is attempted in the limit check processing. The drive control is set to such a control in which the moving speed of the focusing lens group is greater than the minimum speed, and an attempt is made to drive the focusing lens again. If the focusing lens group does not start even after its moving speed is increased, it is judged that it has reached the limit position. In this way, it can be prevented to misjudge that the focusing lens group has reached at the limit position.

Further, when the focusing lens group starts moving again after the driving in accordance with a larger drive control value, the AF control is continued under this drive control condition. Accordingly, the AF control can, thereafter, be carried out more rapidly.

As described above, according to the invention, when the night view mode is set, it is discriminated whether the auxiliary light emission for the AF control is necessary. If necessary, the auxiliary light is emitted toward the object. This prevents the erroneous calculation of the AF control value for the bright background. The AF control value is securely calculated for the object, thereby enabling the taking lens to be focused at the object.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
    a photographing device having a taking lens and operable to photograph a scene consisting of a main object and a background, the photographing device having a selective night view mode for photographing a scene where the brightness of a main object is lower than the brightness of a background and the brightness of the entire scene is lower than a specified value;

an automatic focusing device operable to place the taking lens in an in-focus condition based on light from the scene, the automatic focusing device including:

an auxiliary light emitter operable to emit auxiliary light toward the main object for focusing;

a first determinator operable to determine whether auxiliary light is necessary in the night view mode; and a controller responsive to the first determinator to cause the auxiliary light emitter to emit auxiliary light.

2. A camera as defined in claim 1, wherein the photographing device is provided with a manually operable setting member to set the night view mode.

3. A camera as defined in claim 1, wherein:

the automatic focusing device further includes a second determinator operable to determine whether the main object is in a low contrast state; and the first determinator is responsive to the second determinator to determine the necessity of auxiliary light emission when the main object is in a low contrast state.

4. A camera as defined in claim 1, wherein:

the taking lens is settable at a selective photographic magnification;

the automatic focusing device further includes a second determinator operable to determine whether the photographic magnification is set at a value smaller than a predetermined value; and the first determinator is responsive to the second determinator to determine the necessity of auxiliary light emission when the photographic magnification is set at a value smaller than the predetermined value.

5. A camera as defined in claim 1, wherein:

the photographing device further includes a detector operable to detect the brightness of the main object;

the automatic focusing device further includes a second determinator operable to determine whether the brightness of the main object has a value smaller than a predetermined value; and the first determinator is responsive to the second determinator to determine the necessity of auxiliary light emission when the brightness of the main object has a value smaller than the predetermined value.

6. A camera comprising:

a photographing device having a taking lens and operable to photograph a scene consisting of a main object and a background, the photographing device having a selective night view mode for photographing a scene where the brightness of a main object is lower than the brightness of a background and the brightness of the entire scene is lower than a specified value;

a focus condition detector operable to detect a focus condition of the taking lens;

an auxiliary light emitter operable to emit auxiliary light for focus condition detection;

a determinator operable to determine whether it is necessary to put the auxiliary light emitter in operation in the night view mode;

a first controller responsive to the determinator to cause the auxiliary light emitter to emit auxiliary light to execute a focus condition detection, and adjust the focus condition of the taking lens based on a result of the focus condition detection when the determinator determines that auxiliary light emission is necessary; and a second controller responsive to adjust the focus condition of the taking lens based on a detection result which has been obtained without auxiliary light emission when the determinator determines auxiliary light emission is not necessary.

7. A camera comprising:

a photographing device having a taking lens and operable to photograph a scene consisting of a main object and a background, the photographing device having a selective night view mode suitable for photographing a night scene; and an automatic focusing device operable to place the taking lens in an in-focus condition based on light from a night scene, the automatic focusing device including:

an auxiliary light emitter operable to emit auxiliary light toward the main object for focusing;

a first determinator operable to determine whether auxiliary light is necessary in the night view mode; and a controller responsive to the first determinator to cause the auxiliary light emitter to emit auxiliary light.

8. A camera as defined in claim 7, wherein the photographing device is provided with a manually operable setting member to select the night view mode.

9. A camera as defined in claim 7, wherein:

the automatic focusing device further includes a second determinator operable to determine whether the main object is in a low contrast state; and the first determinator is responsive to the second determinator to determine the necessity of auxiliary light emission when the main object is in a low contrast state.

10. A camera as defined in claim 7, wherein:

the taking lens is settable at a selective photographic magnification;

the automatic focusing device further includes a second determinator operable to determine whether the photographic magnification is set at a value smaller than a predetermined value; and the first determinator is responsive to the second determinator to determine the necessity of auxiliary light emission when the photographic magnification is set at a value smaller than the predetermined value.

11. A camera as defined in claim 7, wherein:

the photographing device further includes a detector operable to detect the brightness of the main object;

the automatic focusing device further includes a second determinator operable to determine whether the brightness of the main object has a value smaller than a predetermined value; and the first determinator is responsive to the second determinator to determine the necessity of auxiliary light emission when the brightness of the main object has a value smaller than the predetermined value.

12. A camera comprising:

a photographing device having a taking lens and operable to photograph a scene consisting of a main object and a background, the photographing device having a selective night view mode suitable for photographing a night scene;

a focus condition detector operable to detect a focus condition of the taking lens;

an auxiliary light emitter operable to emit auxiliary light for focus condition detection;

a determinator operable to determine whether it is necessary to put the auxiliary light emitter in operation in the night view mode;

a first controller responsive to the determinator to cause the auxiliary light emitter to emit auxiliary light to execute a focus condition detection, and adjust the focus condition of the taking lens based on a result of the focus condition detection when the determinator determines that auxiliary light emission is necessary; and a second controller responsive to adjust the focus condition of the taking lens based on a detection result which is obtained without auxiliary light emission when the determinator determines auxiliary light emission is not necessary.

13. A camera comprising:

a photographing device having a taking lens and operable to photograph a scene consisting of a main object and a background, the photographing device having a selective mode suitable for photographing a scene where the brightness or contrast of a main object is lower than the brightness or contrast of a background;

an automatic focusing device operable to place the taking lens in an in-focus condition based on light from the scene, the automatic focusing device including:

an auxiliary emitter operable to emit auxiliary light toward the main object for focusing;

a first determinator operable to determine whether auxiliary light is necessary in the selective mode; and a controller responsive to the first determinator to cause the auxiliary light emitter to emit auxiliary light.

14. A camera as defined in claim 13, wherein the selective mode is a night view mode suitable for photographing a night scene.

15. A camera comprising:

a photographing device having a taking lens and operable to photograph a scene consisting of a main object and a background, the photographing device having a selective mode suitable for photographing a scene where the brightness or contrast of a main object is lower than the brightness or contrast of a background;

a focus condition detector operable to detect a focus condition of the taking lens;

an auxiliary light emitter operable to emit auxiliary light for focus condition detection;

a determinator operable to determine whether it is necessary to put the auxiliary light emitter in operation in the selective mode;

a first controller responsive to the determinator to cause the auxiliary light emitter to emit auxiliary light to execute a focus condition detection, and adjust the focus condition of the taking lens based on a result of the focus condition detection when the determinator determines that auxiliary light emission is necessary; and a second controller responsive to adjust the focus condition of the taking lens based on a detection result which has been obtained without auxiliary light emission when the determinator determines auxiliary light emission is not necessary.

16. A camera as defined in claim 15, wherein the selective mode is a night view mode suitable for photographing a night scene.

\* \* \* \* \*